US008819146B2

(12) United States Patent
Motoyama et al.

(10) Patent No.: US 8,819,146 B2
(45) Date of Patent: *Aug. 26, 2014

(54) SYSTEM, METHOD, AND COMPUTER PROGRAM PRODUCT FOR TRANSFERRING REMOTE DEVICE SUPPORT DATA TO A MONITOR USING E-MAIL

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 11/940,785

(22) Filed: Nov. 15, 2007

(65) Prior Publication Data

US 2008/0133578 A1    Jun. 5, 2008

Related U.S. Application Data

(63) Continuation of application No. 09/953,358, filed on Sep. 17, 2001, now Pat. No. 7,302,469.

(51) Int. Cl.
*G06F 15/16* (2006.01)
(52) U.S. Cl.
USPC ............ 709/206; 709/203; 709/223; 709/224
(58) Field of Classification Search
USPC ................................ 709/203, 206, 223, 224
See application file for complete search history.

(56) References Cited

U.S. PATENT DOCUMENTS

| | | |
|---|---|---|
| 5,412,779 A | 5/1995 | Motoyama |
| 5,537,554 A | 7/1996 | Motoyama |
| 5,544,289 A | 8/1996 | Motoyama |
| 5,568,618 A | 10/1996 | Motoyama |
| 5,649,120 A | 7/1997 | Motoyama |
| 5,715,393 A | 2/1998 | Naugle |
| 5,774,678 A | 6/1998 | Motoyama |
| 5,818,603 A | 10/1998 | Motoyama |
| 5,819,110 A | 10/1998 | Motoyama |
| 5,848,386 A | 12/1998 | Motoyama |
| 5,887,216 A | 3/1999 | Motoyama |

(Continued)

FOREIGN PATENT DOCUMENTS

| | | |
|---|---|---|
| EP | 1 003 307 | 5/2000 |
| EP | 1 083 486 | 3/2001 |

(Continued)

OTHER PUBLICATIONS

RFC-1157, A Simple Network Management Protocol (SNMP), Case et al., May 1990.*

(Continued)

*Primary Examiner* — Rupal Dharia
*Assistant Examiner* — Van Kim T Nguyen
(74) *Attorney, Agent, or Firm* — Oblon, Spivak, McClelland, Maier & Neustadt, L.L.P.

(57) ABSTRACT

In a monitoring system for networked devices, a system, method, and computer program product for transferring monitoring information from a remote monitor to a central monitor responsible for monitoring devices on multiple networks. A communications link is established between a remote monitor and a message transfer server. Monitoring information is formatted into a standard format, encrypted, encoded, and sent from the remote monitor to the central monitor as an attachment to an e-mail sent via the communication link to the message transfer server.

15 Claims, 30 Drawing Sheets

(56) References Cited

U.S. PATENT DOCUMENTS

| | | | |
|---|---|---|---|
| 5,909,493 A | 6/1999 | Motoyama | |
| 6,013,107 A | 1/2000 | Blackshear et al. | |
| 6,085,196 A | 7/2000 | Motoyama et al. | |
| 6,088,125 A * | 7/2000 | Okada et al. | 358/405 |
| 6,208,956 B1 | 3/2001 | Motoyama | |
| 6,279,015 B1 | 8/2001 | Fong et al. | |
| 6,317,848 B1 | 11/2001 | Sorens et al. | |
| 6,330,628 B1 | 12/2001 | Motoyama | |
| 6,333,790 B1 * | 12/2001 | Kageyama | 358/1.15 |
| 6,374,296 B1 | 4/2002 | Lim et al. | |
| 6,381,465 B1 | 4/2002 | Chern et al. | |
| 6,421,608 B1 | 7/2002 | Motoyama et al. | |
| 6,430,711 B1 | 8/2002 | Sekizawa | |
| 6,446,192 B1 | 9/2002 | Narasimhan et al. | |
| 6,473,812 B2 | 10/2002 | Motoyama | |
| 6,535,123 B2 | 3/2003 | Sandelman et al. | |
| 6,577,907 B1 | 6/2003 | Czyszczewski et al. | |
| 6,581,092 B1 | 6/2003 | Motoyama et al. | |
| 6,621,800 B1 | 9/2003 | Klein | |
| 6,631,247 B1 | 10/2003 | Motoyama et al. | |
| 6,662,225 B1 | 12/2003 | Motoyama et al. | |
| 6,694,335 B1 | 2/2004 | Hopmann et al. | |
| 6,697,942 B1 | 2/2004 | L'Heureux et al. | |
| 6,714,971 B2 | 3/2004 | Motoyama et al. | |
| 6,717,513 B1 | 4/2004 | Sandelman et al. | |
| 6,757,714 B1 | 6/2004 | Hansen | |
| 6,760,753 B1 * | 7/2004 | Ohgushi et al. | 709/206 |
| 6,785,711 B1 | 8/2004 | Motoyama et al. | |
| 6,801,331 B1 | 10/2004 | Motoyama | |
| 6,839,717 B1 | 1/2005 | Motoyama et al. | |
| 6,857,016 B1 | 2/2005 | Motoyama et al. | |
| 6,889,263 B2 | 5/2005 | Motoyama | |
| 6,898,623 B1 | 5/2005 | Williams et al. | |
| 6,909,518 B2 | 6/2005 | Miller et al. | |
| 6,915,337 B1 | 7/2005 | Motoyama et al. | |
| 6,915,342 B1 | 7/2005 | Motoyama | |
| 6,925,571 B1 | 8/2005 | Motoyama et al. | |
| 6,928,493 B2 | 8/2005 | Motoyama | |
| 6,931,447 B1 | 8/2005 | Hemstreet et al. | |
| 6,948,175 B1 | 9/2005 | Fong et al. | |
| 6,961,659 B2 | 11/2005 | Motoyama et al. | |
| 6,970,952 B2 | 11/2005 | Motoyama | |
| 6,975,422 B2 * | 12/2005 | Kurz et al. | 358/1.16 |
| 6,988,141 B1 | 1/2006 | Motoyama et al. | |
| 7,043,551 B2 | 5/2006 | Motoyama et al. | |
| 7,053,767 B2 | 5/2006 | Petite et al. | |
| 7,120,674 B1 | 10/2006 | Motoyama et al. | |
| 7,120,707 B2 | 10/2006 | Motoyama | |
| 7,131,070 B1 | 10/2006 | Motoyama et al. | |
| 7,159,022 B2 * | 1/2007 | Primm et al. | 709/224 |
| 7,181,619 B2 | 2/2007 | Motoyama et al. | |
| 7,185,080 B1 | 2/2007 | Motoyama | |
| 7,194,537 B2 | 3/2007 | Motoyama et al. | |
| 7,194,560 B2 | 3/2007 | Motoyama | |
| 7,209,952 B2 | 4/2007 | Fong et al. | |
| 7,212,300 B2 * | 5/2007 | Comer et al. | 358/1.15 |
| 7,265,819 B2 * | 9/2007 | Raney | 358/1.15 |
| 7,271,928 B2 * | 9/2007 | Naito et al. | 358/1.15 |
| 7,287,085 B1 | 10/2007 | Motoyama et al. | |
| 7,289,995 B2 | 10/2007 | Motoyama et al. | |
| 7,293,081 B2 | 11/2007 | Motoyama et al. | |
| 7,321,867 B1 * | 1/2008 | Uchida et al. | 705/26 |
| 7,548,331 B2 * | 6/2009 | Ferlitsch | 358/1.15 |
| 7,584,273 B2 * | 9/2009 | Shibata | 709/223 |
| 7,779,026 B2 * | 8/2010 | Faulkner et al. | 707/769 |
| 2001/0037358 A1 | 11/2001 | Clubb et al. | |
| 2002/0004812 A1 | 1/2002 | Motoyama | |
| 2002/0007390 A1 | 1/2002 | Motoyama | |
| 2002/0143914 A1 | 10/2002 | Cihula | |
| 2002/0152292 A1 | 10/2002 | Motoyama et al. | |
| 2002/0174183 A1 | 11/2002 | Saeidi | |
| 2002/0184408 A1 | 12/2002 | Hannigan et al. | |
| 2003/0002074 A1 * | 1/2003 | Miyano | 358/1.15 |
| 2003/0046584 A1 | 3/2003 | Laksono | |
| 2003/0055953 A1 | 3/2003 | Motoyama et al. | |
| 2003/0086122 A1 | 5/2003 | Parry | |
| 2003/0093522 A1 | 5/2003 | Motoyama | |
| 2003/0167323 A1 | 9/2003 | Motoyama et al. | |
| 2003/0177227 A1 | 9/2003 | Motoyama et al. | |
| 2004/0030779 A1 | 2/2004 | Motoyama et al. | |
| 2004/0068549 A1 | 4/2004 | Motoyama | |
| 2004/0128365 A1 | 7/2004 | Motoyama et al. | |
| 2004/0139183 A1 | 7/2004 | Motoyama et al. | |
| 2004/0215744 A1 | 10/2004 | Motoyama et al. | |
| 2004/0226018 A1 | 11/2004 | Motoyama et al. | |
| 2005/0015487 A1 | 1/2005 | Motoyama et al. | |
| 2005/0033872 A1 | 2/2005 | Motoyama | |
| 2005/0063367 A1 | 3/2005 | Motoyama | |
| 2005/0165929 A1 | 7/2005 | Motoyama | |
| 2005/0210131 A1 | 9/2005 | Motoyama et al. | |
| 2005/0240939 A1 | 10/2005 | Motoyama et al. | |
| 2005/0246425 A1 | 11/2005 | Motoyama et al. | |
| 2005/0246426 A1 | 11/2005 | Motoyama et al. | |
| 2005/0246437 A1 | 11/2005 | Motoyama et al. | |
| 2005/0246439 A1 | 11/2005 | Fong et al. | |
| 2005/0256934 A1 | 11/2005 | Motoyama | |
| 2005/0262202 A1 | 11/2005 | Motoyama et al. | |
| 2005/0278428 A1 | 12/2005 | Motoyama et al. | |
| 2005/0278442 A1 | 12/2005 | Motoyama et al. | |
| 2006/0031538 A1 | 2/2006 | Motoyama et al. | |
| 2006/0041380 A1 | 2/2006 | Motoyama et al. | |
| 2006/0075097 A1 | 4/2006 | Motoyama | |
| 2006/0101125 A1 | 5/2006 | Motoyama | |
| 2006/0155824 A1 | 7/2006 | Motoyama et al. | |
| 2006/0155845 A1 | 7/2006 | Motoyama et al. | |
| 2006/0155846 A1 | 7/2006 | Motoyama et al. | |
| 2006/0168063 A1 | 7/2006 | Motoyama | |
| 2006/0168085 A1 | 7/2006 | Motoyama | |
| 2006/0168103 A1 | 7/2006 | Motoyama et al. | |
| 2006/0168197 A1 | 7/2006 | Motoyama et al. | |
| 2006/0184633 A1 | 8/2006 | Motoyama et al. | |
| 2006/0184659 A1 | 8/2006 | Motoyama et al. | |
| 2007/0027951 A1 | 2/2007 | Motoyama et al. | |
| 2007/0033266 A1 | 2/2007 | Motoyama et al. | |
| 2007/0033267 A1 | 2/2007 | Motoyama et al. | |
| 2007/0033268 A1 | 2/2007 | Motoyama et al. | |
| 2007/0033530 A1 | 2/2007 | Motoyama et al. | |
| 2007/0073862 A1 | 3/2007 | Motoyama et al. | |
| 2007/0073863 A1 | 3/2007 | Motoyama et al. | |
| 2007/0073864 A1 | 3/2007 | Motoyama et al. | |
| 2007/0073865 A1 | 3/2007 | Motoyama et al. | |
| 2007/0124455 A1 | 5/2007 | Motoyama et al. | |
| 2007/0150543 A1 | 6/2007 | Fong et al. | |
| 2007/0201496 A1 | 8/2007 | Motoyama | |
| 2008/0022293 A1 | 1/2008 | Motoyama et al. | |

FOREIGN PATENT DOCUMENTS

| | | |
|---|---|---|
| JP | 2-172348 | 7/1990 |
| WO | WO 92/22033 | 12/1992 |
| WO | WO 00/23894 | 4/2000 |

OTHER PUBLICATIONS

U.S. Appl. No. 12/062,146, filed Apr. 3, 2008, Motoyama, et al.
U.S. Appl. No. 12/189,886, filed Aug. 12, 2008, Motoyama.
U.S. Appl. No. 12/276,951, filed Nov. 24, 2008, Motoyama.
Office Action issued Sep. 14, 2010, in Norway Patent Application No. 20024444 filed Sep. 17, 2002, 2 pages.
U.S. Appl. No. 13/472,054, filed May 15, 2012, Motoyama, et al.
U.S. Appl. No. 13/682,852, filed Nov. 21, 2012, Motoyama.
U.S. Appl. No. 12/710,971, filed Feb. 23, 2010, Motoyama, et al.

* cited by examiner

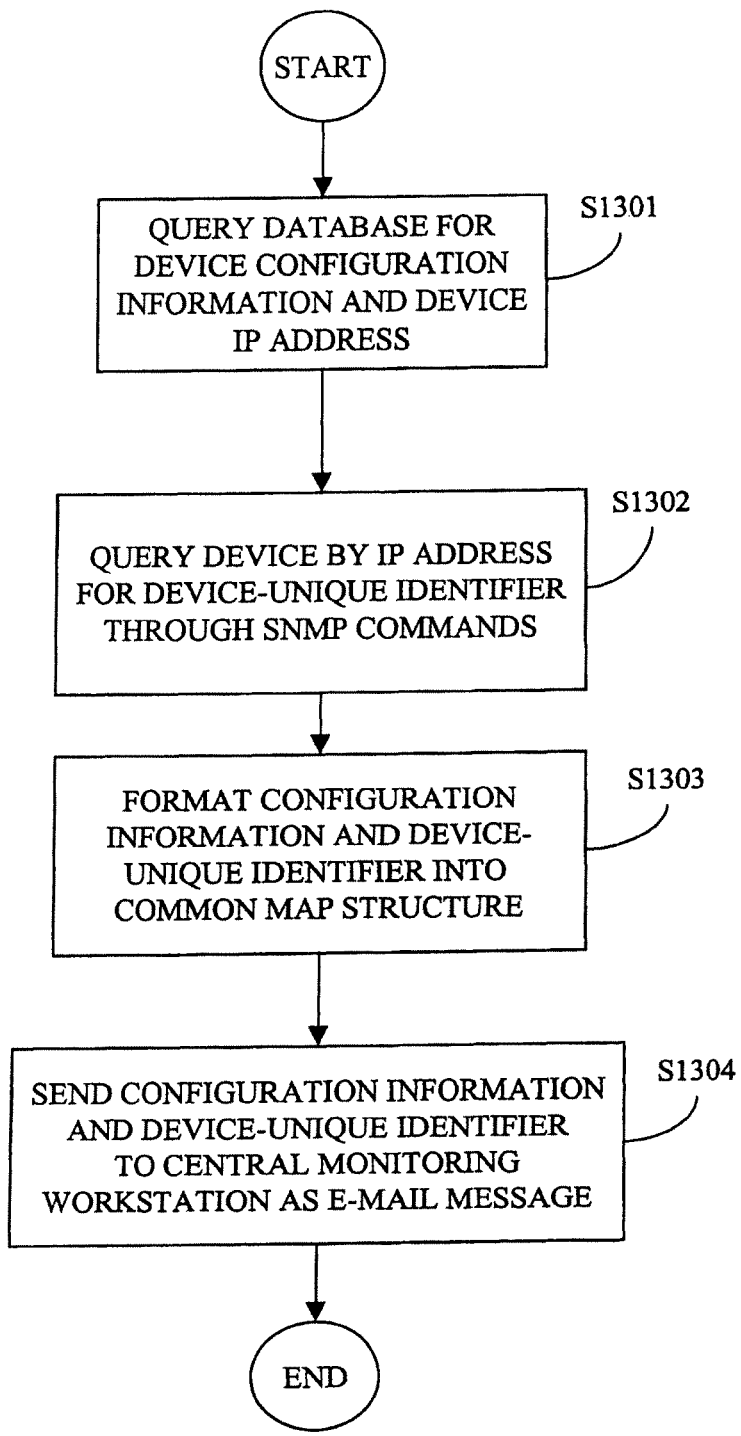

Device Information package

Device Monitor Package Class Structure

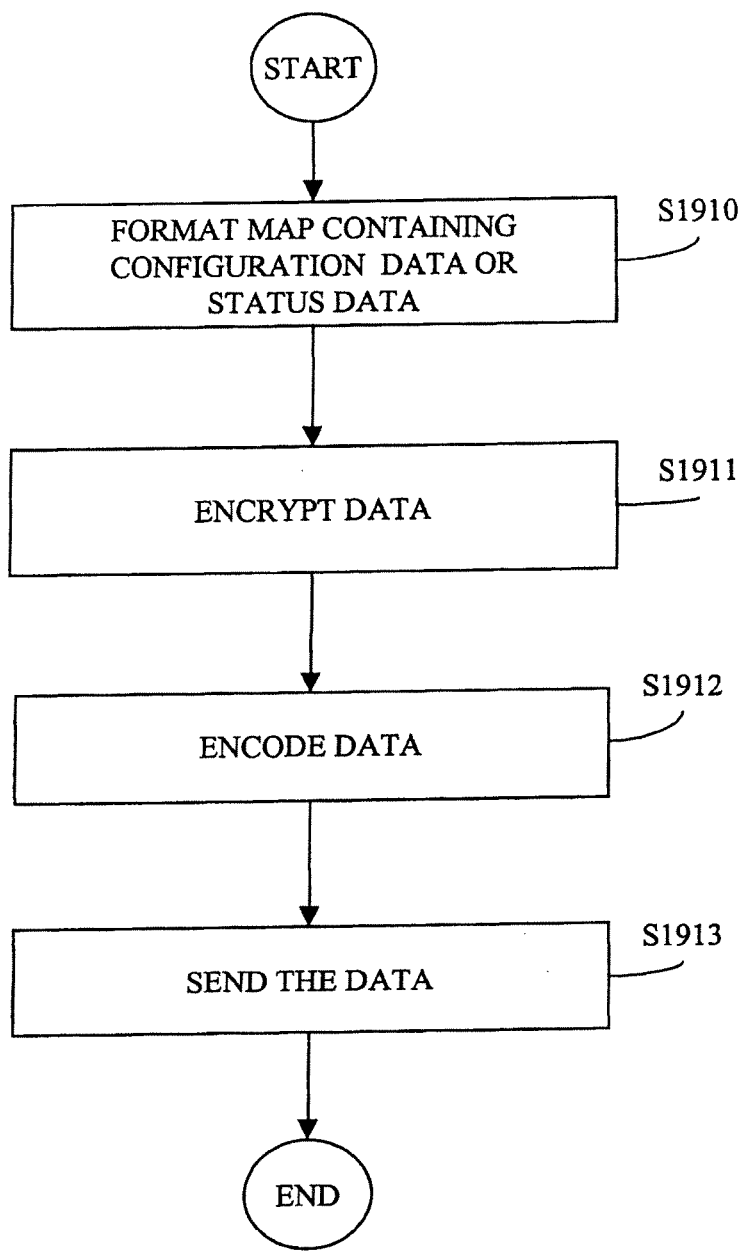

Data Transfer Package

SYSTEM, METHOD, AND COMPUTER PROGRAM PRODUCT FOR TRANSFERRING REMOTE DEVICE SUPPORT DATA TO A MONITOR USING E-MAIL

CROSS-REFERENCE TO RELATED APPLICATIONS

The present application is related to U.S. patent application Ser. No. 09/190,460, filed Nov. 13, 1998, entitled "Method and System for Translating Documents Using Different Translation Resources for Different Portions of the Documents," which is a continuation of U.S. patent application Ser. No. 08/654,207, filed May 28, 1996, entitled "Method and System for Translating Documents Using Different Translation Resources for Different Portions of the Documents," now U.S. Pat. No. 5,848,386; U.S. patent application Ser. No. 08/997,705, filed Dec. 23, 1997, entitled "Object-oriented System and Computer Program Product for Mapping Structured Information to Different Structured Information," now U.S. Pat. No. 6,085,196; U.S. patent application Ser. No. 08/997,705, filed Dec. 23, 1997, entitled "Method and Apparatus for Providing a Graphical User Interface for Creating and Editing a Mapping of a First Structural Description to a Second Structural Description"; U.S. patent application Ser. No. 09/756,120, filed Jan. 9, 2001, entitled "Method and System of Remote Support Of Device Using Email"; U.S. patent application Ser. No. 09/668,162, filed Sep. 25, 2000, entitled "Method and System of Data collection and Mapping From a Remote Position Reporting Device"; U.S. patent application Ser. No. 09/575,710, filed Jul. 25, 2000, entitled "Method and System of Remote Diagnostic and Information Collection and Service System"; U.S. patent application Ser. No. 09/575,702, filed Jul. 12, 2000, entitled "Method and System of Remote Position Report Device"; U.S. patent application Ser. No. 09/453,934, filed May 17, 2000, entitled "Method and System of Remote Diagnostic, Control and Information Collection Using a Dynamic Linked Library for Multiple Formats and Multiple Protocols"; U.S. patent application Ser. No. 09/453,935, filed May 17, 2000, entitled "Method and System of Remote Diagnostic, Control and Information Collection Using a Dynamic Linked Library of Multiple Formats and Multiple Protocols With Intelligent Protocol Processor"; U.S. patent application Ser. No. 09/453,937, filed May 17, 2000, entitled "Method and System of Remote Diagnostic, Control and Information Collection Using a Dynamic Linked Library of Multiple Formats and Multiple Protocols With Restriction on Protocol"; U.S. patent application Ser. No. 09/453,936, filed May 17, 2000, entitled "Method and System of Remote Diagnostic, Control and Information Collection Using a Dynamic Linked Library of Multiple Formats and Multiple Protocols with Intelligent Formatter"; U.S. patent application Ser. No. 09/542,284, filed Apr. 4, 2000, entitled "System and Method to Display Various Messages While Performing the Tasks or While Idling"; U.S. patent application Ser. No. 09/520,368, filed on Mar. 7, 2000, entitled "Method and System for Updating the Device Driver of a Business Office Appliance"; U.S. patent application Ser. No. 09/453,877, filed Feb. 4, 2000, entitled "Method and System for Maintaining a Business Office Appliance through Log Files"; U.S. patent application Ser. No. 09/440,692, filed Nov. 16, 1999, entitled "Method and System to Monitor the Application Usage and Send Back the Information Using Connection and Connectionless Mode"; U.S. patent application Ser. No. 09/440,693, filed Nov. 16, 1999, entitled "Method and System of Remote Diagnostic, Control and Information Collection Using a Dynamic Linked Library"; U.S. patent application Ser. No. 09/440,647, filed Nov. 16, 1999, entitled "Method and System to Monitor the Application Usage and Send Back the Information Using Connection and Connectionless Mode"; U.S. patent application Ser. No. 09/440,646, filed Nov. 16, 1999, entitled "Method and System to Monitor the Application Usage and Send Back the Information Using Connection and Connectionless Mode"; U.S. patent application Ser. No. 09/440,645, filed Nov. 16, 1999, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manager"; U.S. patent application Ser. No. 09/407,769, filed Sep. 29, 1999, entitled "Method and System for Remote Diagnostic, Control and Information Collection Based on various Communication Modes for Sending Messages to Users"; U.S. patent application Ser. No. 09/393,677, filed Sep. 10, 1999, entitled "Application Unit Monitoring and Reporting System and Method"; U.S. patent application Ser. No. 09/311,148, filed May 13, 1999, entitled "Application Unit Monitoring and Reporting System and Method"; U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26, 1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216; U.S. patent application Ser. No. 08/733,134, filed Oct. 16, 1996, entitled "Method and System for Diagnosis and Control of Machines Using Connectionless Modes of Communication," now U.S. Pat. No. 5,909,493; U.S. patent application Ser. No. 08/880,683, filed Jun. 23, 1997, U.S. patent application Ser. Nos. 09/107,989 and 09/108,705, both of which were filed Jul. 1, 1998, all three of which are entitled "Method and System for Controlling and Communicating, with Machines Using Multiple Communication Formats," and all three of which are divisions of U.S. patent application Ser. No. 08/624,228, filed Mar. 29, 1996, entitled "Method and System for Controlling and Communicating with Machines Using Multiple Communication Formats," now U.S. Pat. No. 5,818,603; U.S. patent application Ser. No. 09/457,669, entitled "Method and System for Diagnosis and Control of Machines Using Connection and Connectionless Modes of Communication," filed Dec. 9, 1999, which is a continuation of U.S. patent application Ser. No. 08/916,009, entitled "Method and System for Diagnosis and Control of Machines Using Connection and Connectionless Modes of Communication," filed Aug. 21, 1997, which is a continuation of U.S. patent application Ser. Nos. 08/738,659 and 08/738,461, filed Oct. 30, 1996, both of which are entitled "Method and System for Diagnosis and Control of Machines Using Connection and Connectionless Modes of Communication," which are divisions of U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110; U.S. patent application Ser. No. 08/852,413, filed May 7, 1987, entitled "Method and System for Controlling and Communicating with Business Office Devices," now U.S. Pat. No. 5,774,678, which is a continuation of U.S. patent application Ser. No.

08/698,068, filed Aug. 15, 1996, entitled "Method and Apparatus for Controlling and Communicating With Business Office Devices", now U.S. Pat. No. 5,649,120, which is a continuation of U.S. patent application Ser. No. 08/562,192, filed Nov. 22, 1995, now U.S. Pat. No. 5,568,618, entitled "Method and Apparatus for Controlling and Communicating With Business Office Devices", which is a continuation of U.S. patent application Ser. No. 08/473,780, filed Jun. 6, 1995, entitled "Method and Apparatus for Controlling and Communicating With Business Office Devices", now U.S. Pat. No. 5,544,289, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, which is a continuation of U.S. patent application Ser. No. 08/282,168, filed Jul. 28, 1994, entitled "Method and Apparatus for Controlling and Communicating With Business Office Devices", now U.S. Pat. No. 5,412,779, which is a continuation of U.S. patent application Ser. No. 07/902,462, filed Jun. 19, 1992, now abandoned, which is a continuation of U.S. patent application Ser. No. 07/549,278, filed Jul. 6, 1990, now abandoned; U.S. patent application Ser. No. 09/953,359, filed Sep. 17, 2001, entitled "SYSTEM, METHOD, AND COMPUTER PROGRAM PRODUCT FOR SENDING REMOTE DEVICE CONFIGURATION INFORMATION TO A MONITOR USING E-MAIL"; and U.S. patent application Ser. No. 09/953,357, filed Sep. 17, 2001, entitled "SYSTEM, METHOD, AND COMPUTER PROGRAM PRODUCT FOR SENDING PERSISTENT AND NON-PERSISTENT STATUS INFORMATION TO A MONITOR USING E-MAIL", the entire contents of each of these applications and patents are incorporated herein by reference.

BACKGROUND OF THE INVENTION

1. Field of the Invention

This invention relates to systems, methods, and computer program products for monitoring networked devices. Configuration and status information is gathered from the networked devices by a remote monitor and is sent in an electronic mail form, such as e-mail, to a central monitoring site.

2. Discussion of the Background

Co-pending U.S. patent application Ser. No. 09/756,120 filed on Jan. 9, 2001, describes a system for remotely monitoring networked devices using e-mail. As described in that application, the Simple Network Management Protocol (SNMP) is used by a remote monitor to collect information from networked devices. The collected information is then sent to a central monitor using, for example, e-mail.

In order to remotely monitor devices, both configuration information and status information are collected. Accordingly, as described in the above-referenced application, both configuration and status information are sent from the remote monitor to the central monitor. The configuration information may include, for example, device make and model information, device-unique serial number and address information, device physical location information, contact information, etc. The status information may include any number of alarm and state conditions depending on the type of device. For example, a printer may include a "paper jam" indicator, or an "out of paper" indicator, etc., while a business office appliance may include other indicators.

As the number of different classes of information (e.g., configuration or status) increases, or the number of different types of devices being supported increases, the complexity of remotely monitoring these devices also increases.

SUMMARY OF THE INVENTION

The inventors of the present invention have recognized that it would be advantageous to have a simple interface for transferring information using a commonly available resource in a system for remotely monitoring networked devices. The present inventors have further recognized that it would be advantageous to have an extensible data transfer capability that supports the transfer of different classes of information, for example, configuration information or status information, using a commonly available resource such as Internet e-mail. Moreover, the present inventors have recognized that it would be further advantageous if the transfer capability could be customized or extended without impacting a small set of public methods used to implement a core set of functionality supported by the data transfer capability.

The present invention provides a system, method, and computer program product through which different classes of information are transferred from a remote monitor to a central monitor using, for example, Internet e-mail as a transfer mechanism. By having a simple interface, the complexities of performing the data transfer are hidden from applications using the data transfer mechanism. The present invention provides a data transfer capability that can be extended to include further capabilities, such as, for example, an encryption capability, without impacting the simple interface, and without impacting the ability to make use of a commonly available transfer mechanism, such as Internet e-mail.

In one embodiment, the data transfer capability of the present invention makes use of the commonly-available Internet e-mail as a transfer mechanism, and its capabilities are available through a public interface that includes a small set of functions. Through this small set of functions, a communication link between a remote monitor and a central monitor may be established, and information may be transferred from the remote monitor to the central monitor via Internet e-mail. The information that is sent may be either configuration information or status information. The same four methods are used irrespective of the type of information that is being transferred, thereby providing for ease in integration of the data transfer capability of the present invention.

The data transfer mechanism has been designed to be extensible without impacting the small set of functions that make up the public interface described above. For example, an abstract class has been provided through which encryption capabilities may be added. New derived classes of this abstract class can be added to support application-specific encryption needs. Any complexity added by a custom encryption capability is hidden from the public interface, and therefore will not impact the application making use of the data transfer mechanism.

One advantage of the present invention is that as more types of microprocessor-based devices become available, the data transfer capability of the present invention can be easily adapted to support these devices. The present invention provides an extensible capability that supports sending different classes of information using a commonly-available transport mechanism with a small set of functions making up the public interface. Furthermore, as the commonly-available transport mechanisms are improved, or replaced by superior capabilities, the simple public interface will continue to apply, and, therefore, can be taken advantage of without the need to modify the applications using the data transfer capability of the present invention.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13A is a flowchart illustrating a process implemented by the device information module shown in FIG. 11;

FIG. 19B is a flowchart illustrating a process for sending information according to one embodiment of the present invention;

DESCRIPTION OF THE PREFERRED EMBODIMENTS

Figure 1:
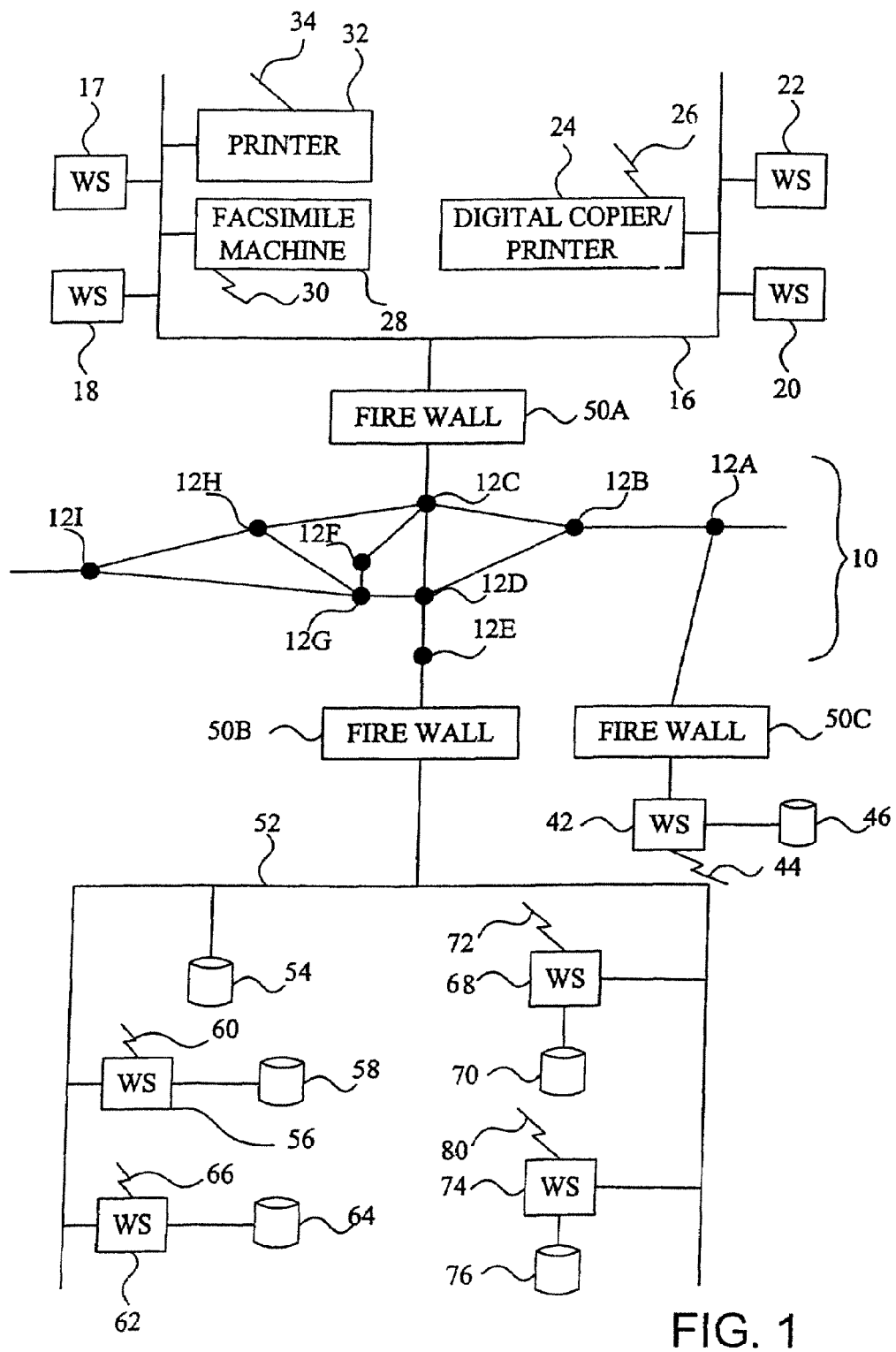
FIG. 1 illustrates three networked business office devices connected to a network of computers and databases through the Internet.

Referring now to the drawings, and more particularly to FIG. 1 thereof, there are illustrated (1) various machines and (2) computers for monitoring, diagnosing and controlling the operation of the machines. In FIG. 1, there is a first network 16, such as a Local Area Network (LAN) connected to computer workstations 17, 18, 20 and 22. The workstations can be any type of computers including, e.g., IBM Personal Computer compatible devices, Unix-based computers, Linux-based computers or Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines or monitored devices and other types of devices may be used as the machines or monitored devices, including any of the devices discussed below. In some configurations, one or more workstations may be converted to business office appliances. One example of such a business office appliance is eCabinet from Ricoh, which was demonstrated at Fall Comdex in 1999 at Las Vegas. Also, a facsimile server (not illustrated) may be connected to the network 16 and have a telephone, Integrated Services Digital Network (ISDN), cable or wireless connection. In addition to the digital image forming apparatus 24, facsimile machine 28, and printer 32 being connected to the network 16, these devices may also include conventional telephone and/or ISDN and/or cable and/or wireless connections 26, 30 and 34, respectively. As is explained below, the business office machines, business devices, or business office appliances 24, 28 and 32 communicate with a remote monitoring, diagnosis, and control station, also referred to as a monitoring device, through, for example, the Internet via the network 16 or by a direct telephone, ISDN, wireless, or cable connection.

In FIG. 1, a wide area network (WAN) (e.g., the Internet or its successor) is generally designated by 10. The WAN 10 can be either a private WAN, a public WAN or a hybrid. The WAN 10 includes a plurality of interconnected computers and routers designated by 12A-12I. The manner of communicating over a WAN is known through a series of Request for Comments (RFC) documents available from the Internet Engineering Task Force (IETF) at http://www.ietf.org/rfc.html, including RFC 821 entitled "Simple Mail Transfer Protocol"; RFC 822 entitled "Standard for the Format of ARPA Internet Text Message"; RFC 959 entitled "File Transfer Protocol (FTP)"; RFC 2045 entitled "Multipurpose Internet Mail Extensions (MIME) Part One: Format of Internet Message Bodies"; RFC 1894 entitled "An Extensible Message Format for Delivery Status Notifications"; RFC 1939 entitled "Post Office protocol-Version 3"; and RFC 2298 entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W. R. Stevens, from Addison-Wesley Publishing Company, 1994, the entire contents of which is incorporated herein by reference. Volumes 1-3 of "Internetworking with TCP/IP" by Comer and Stevens are also incorporated herein by reference in their entirety.

In FIG. 1, a firewall 50A is connected between the WAN 10 and the network 16. A firewall is a device that allows only authorized computers on one side of the firewall to access a network, computers or individual parts on the other side of the firewall. Firewalls are known and commercially available devices and/or software (e.g., SunScreen from Sun Microsystems Inc.). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, AddisonWesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68 and 74. These workstations may be in different departments (e.g., marketing, manufacturing, design engineering, and customer service departments) within a single company. In addition to the workstations connected via the network 52, there is a workstation 42, which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or an ISDN and/or a cable and/or a wireless network 44, and the database in disk 46 may be accessed through the telephone line, the ISDN, the cable or wirelessly. The cable used by this invention may be implemented using a cable that is typically used to carry television programming, a cable that provides for high-speed communication of digital data typically used with computers or the like, or any other desired type of cable.

Information of the business office machines, business devices or business office appliances 24, 28 and 32 maybe stored in one or more of the databases stored in the disks 46, 54, 58, 64, 70 and 76. Known databases include (1) SQL databases by Microsoft, IBM, Oracle and Sybase (2) other relational databases, and (3) non-relational databases (including object oriented databases from Computer Associates, JYD Software Engineering, and Orient Technologies). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases.

In addition to the workstations 56, 62, 68, 74 and 42 being connected to the WAN 10, these workstations may also include a connection to a telephone line, ISDN, cable, or wireless network which provides a secure connection to the machine being monitored, diagnosed and/or controlled, and is used during communication. Additionally, if one communication medium is not operating properly, one of the others can be automatically used for communication.

A feature of the present invention is the use of a "store-and-forward" mode of communication (e.g., Internet electronic mail, also referred to herein as e-mail) or transmission between a machine and a computer for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
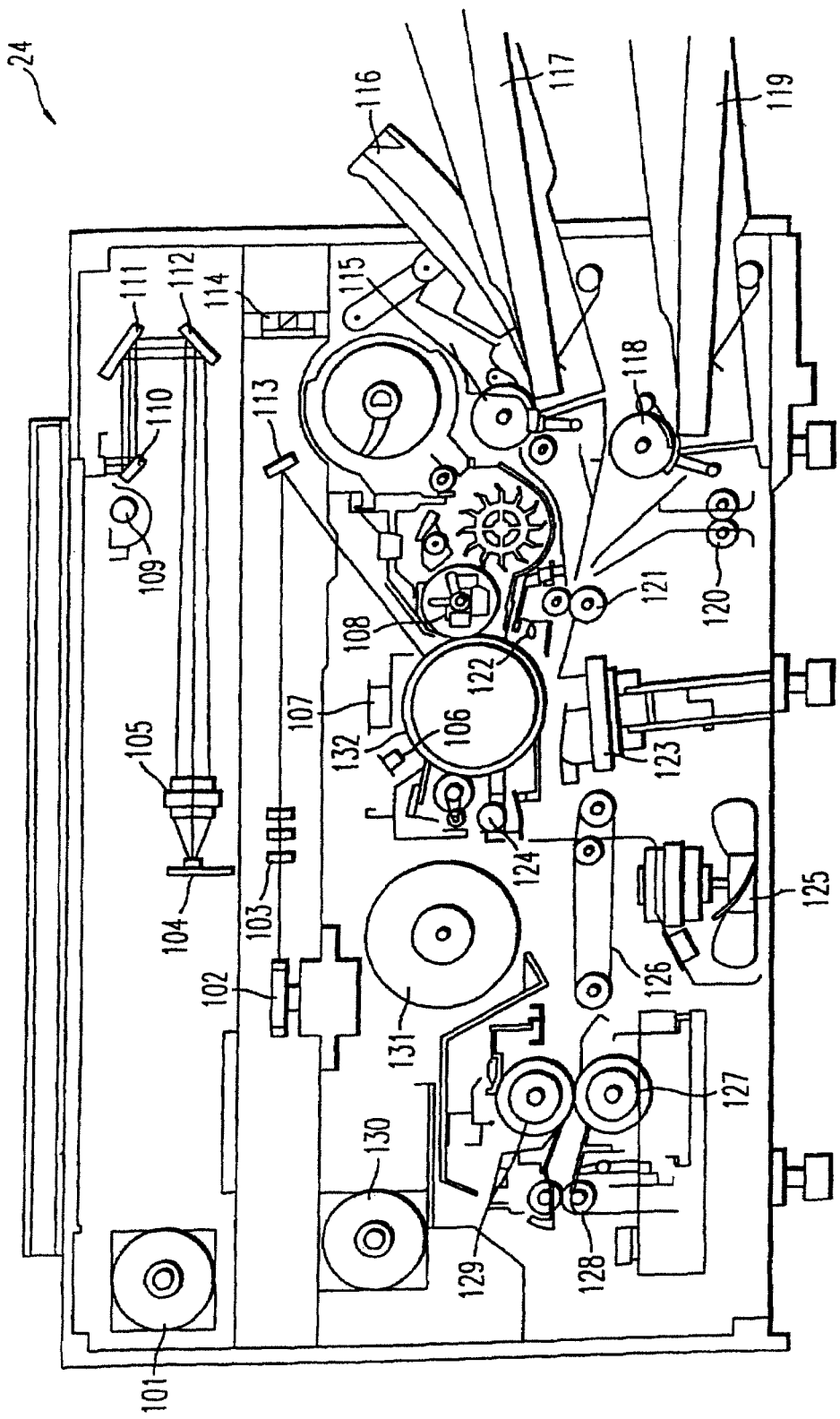
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital image forming apparatus, and reference numeral 115 designates a first paper feed roller used for feeding paper from the first paper cassette 117, and reference numeral 116 designates a manual feed table. Similarly, reference numeral 118 designates a second paper feed roller for the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. Reference numeral 129 designates a hot roller used to fix toner onto the paper, 130 designates an exhaust fan and 131 designates the main motor used to drive the digital image forming apparatus.

Figure 3:
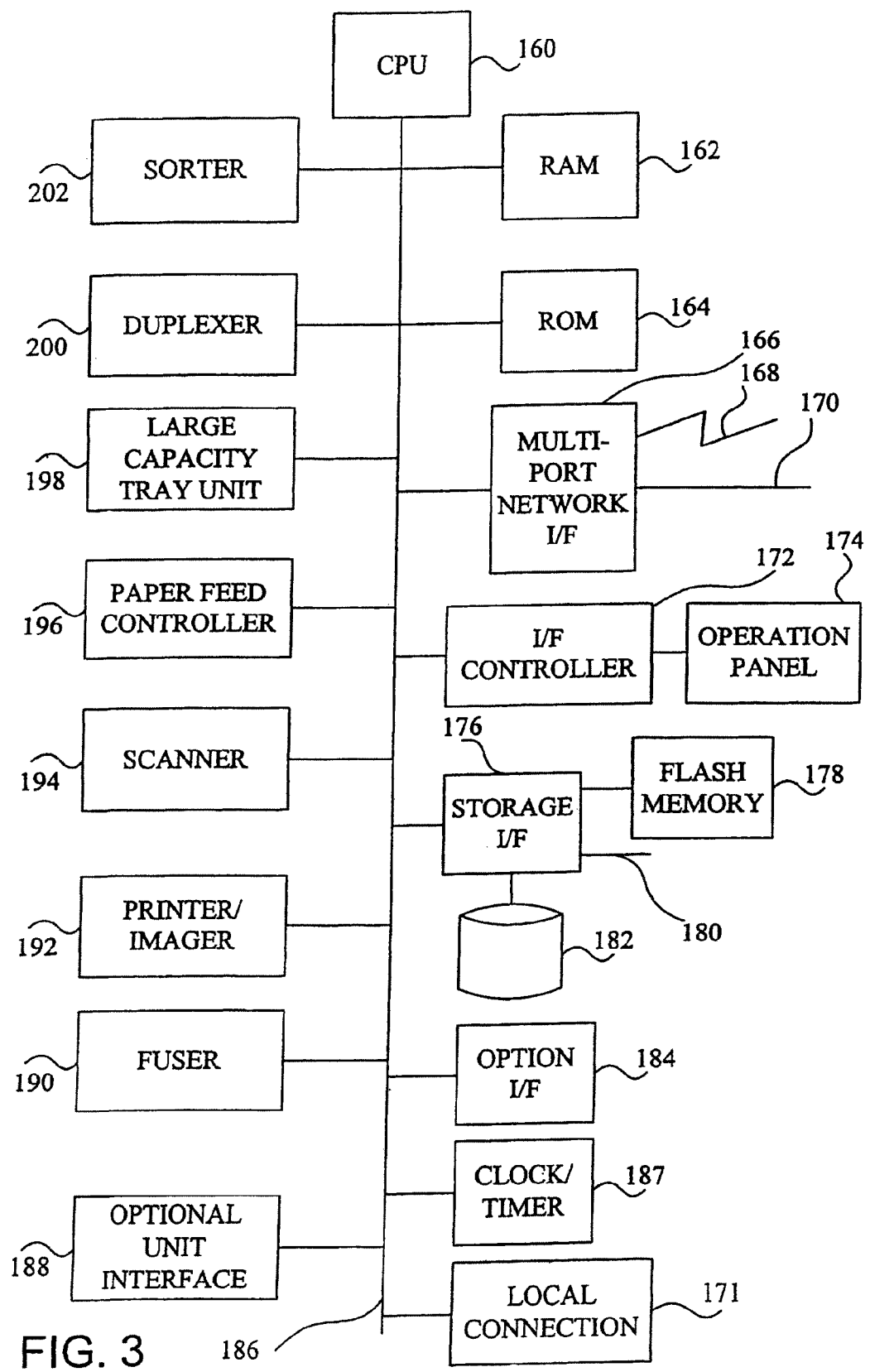
FIG. 3 illustrates the electronic components of the digital image forming apparatus illustrated in FIG. 2.

FIG. 3 is a block diagram illustrating the electronic components of the digital image forming apparatus of FIG. 2. The CPU 160 is a microprocessor and acts as the system's controller. Random access memory (RAM) 162 stores dynamically changing information including operating parameters of the digital image forming apparatus. A non-volatile memory (e.g., a read only memory 10 (ROM) 164 or a Flash Memory) stores (1) the program code used to run the digital image forming apparatus and (2) static-state data, describing the copier (e.g., the model number, serial number of the copier, and default parameters).

There is a multi-port network interface 166 which allows the digital image forming apparatus to communicate with external devices through at least one network. Reference number 168 represents a telephone, ISDN, or cable line, and numeral 170 represents another type of network. Additional details of the multi-port network interface are described with respect to FIG. 4. An interface controller 172 is used to connect an operation panel 174 to a system bus 186. The operation panel 174 includes standard input and output devices found on a digital image forming apparatus including a copy button, keys to control the operation of the copier such as number of copies, reduction/enlargement, darkness/lightness, etc. Additionally, a liquid crystal display may be included within the operation panel 174 to display parameters and messages of the digital image forming apparatus to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. The storage devices include a flash memory 178, which can be substituted by a conventional Electrically Erasable Programmable Read Only Memory (EEPROM), and a disk 182. The disk 182 includes a hard disk, optical disk, and/or a floppy disk drive. There is a connection 180 connected to the storage interface 176 which allows for additional memory devices to be connected to the digital image forming apparatus. The flash memory 178 is used to store semi-static state data which describes parameters of the digital image forming apparatus which infrequently change over the life of the copier. Such parameters include the options and configuration of the digital image forming apparatus. An option interface 184 allows additional hardware such as an external interface to be connected to the digital image forming apparatus. A clock/timer 187 is utilized to keep track of both the time and date and also to measure elapsed time.

On the left side of FIG. 3, the various sections making up the digital image forming device are illustrated. Reference numeral 202 designates a sorter and contains sensors and actuators used to sort the output of the digital image forming device. There is a duplexer 200 which allows a duplex operation to be performed by the digital image forming device and includes conventional sensors and actuators. The digital image forming device includes a large capacity tray unit 198 which allows paper trays holding a large number of sheets to be used with the digital image forming device. The large capacity tray unit 198 includes conventional sensors and actuators.

A paper feed controller 196 is used to control the operation of feeding paper into and through the digital image forming device. A scanner 194 is used to scan images into the digital image forming device—and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device.

Figure 4:
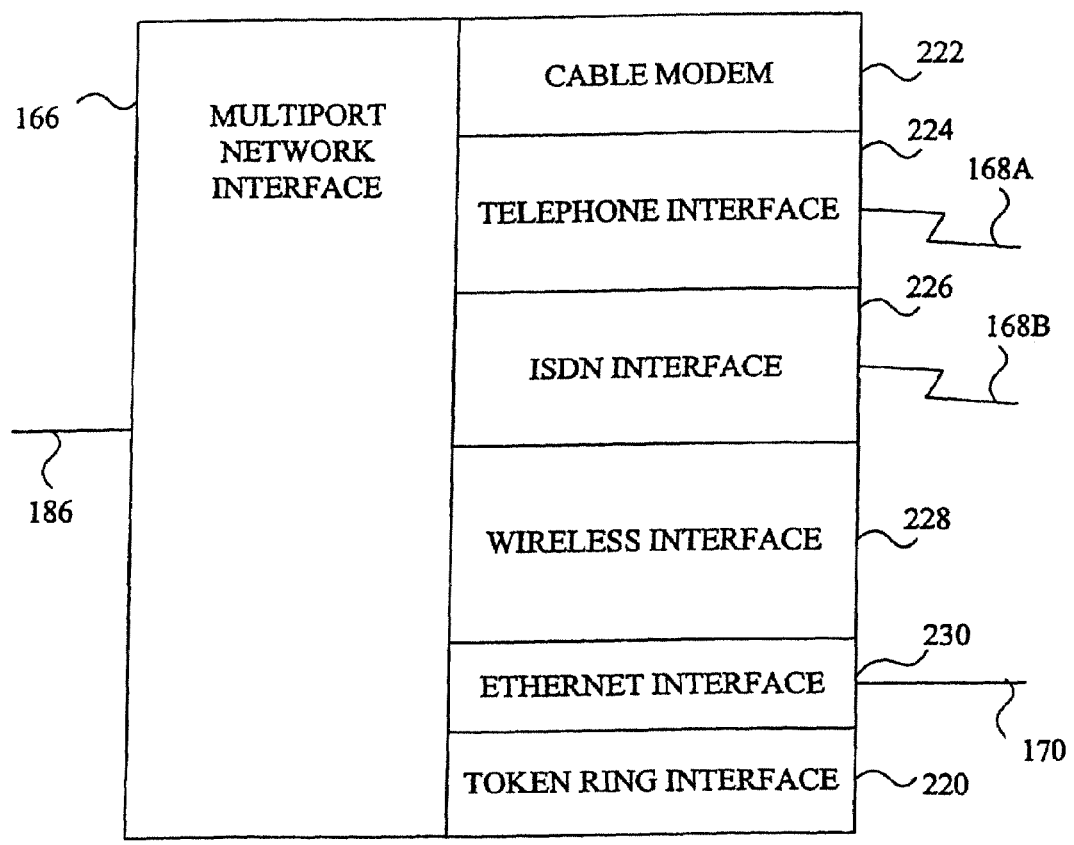
FIG. 4 illustrates details of a multi-port communication interface illustrated in FIG. 3.

FIG. 4 illustrates details of the multi-port network interface 166. The digital image forming device may communicate to external devices through a token ring interface 220, a cable modem unit 222, which has a high speed connection over cable, a conventional telephone interface 224, which connects to a telephone line 168A, an ISDN interface 226, which connects to an ISDN line 168B, a wireless interface 228, or an ethernet interface 230, which connects to a LAN 170. Other interfaces may include, but are not limited to, a Digital Subscriber Line (DSL) (original DSL, concentric DSL, and asymmetric DSL). A single device which connects to both a Local Area Network and a telephone line is commercially available from Megahertz and is known as the Ethernet-Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162 or the flash memory 178 or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, or other business office machines, a business office appliance, or other appliances (e.g., a microwave oven, VCR, digital camera, cellular phone, palm top computer). Additionally, the present invention includes other types of devices which operate using store-and-forward or direct connection-based communication. Such devices include metering systems (including gas, water, or electricity metering systems), vending machines, or any mechanical device (e.g., automobiles) that needs to be monitored during operation or remote diagnosis. In addition to monitoring special purpose machines and computers, the invention can be used to monitor, control, and diagnose a general purpose computer that would be the monitored and/or controlled device.

Figure 5:
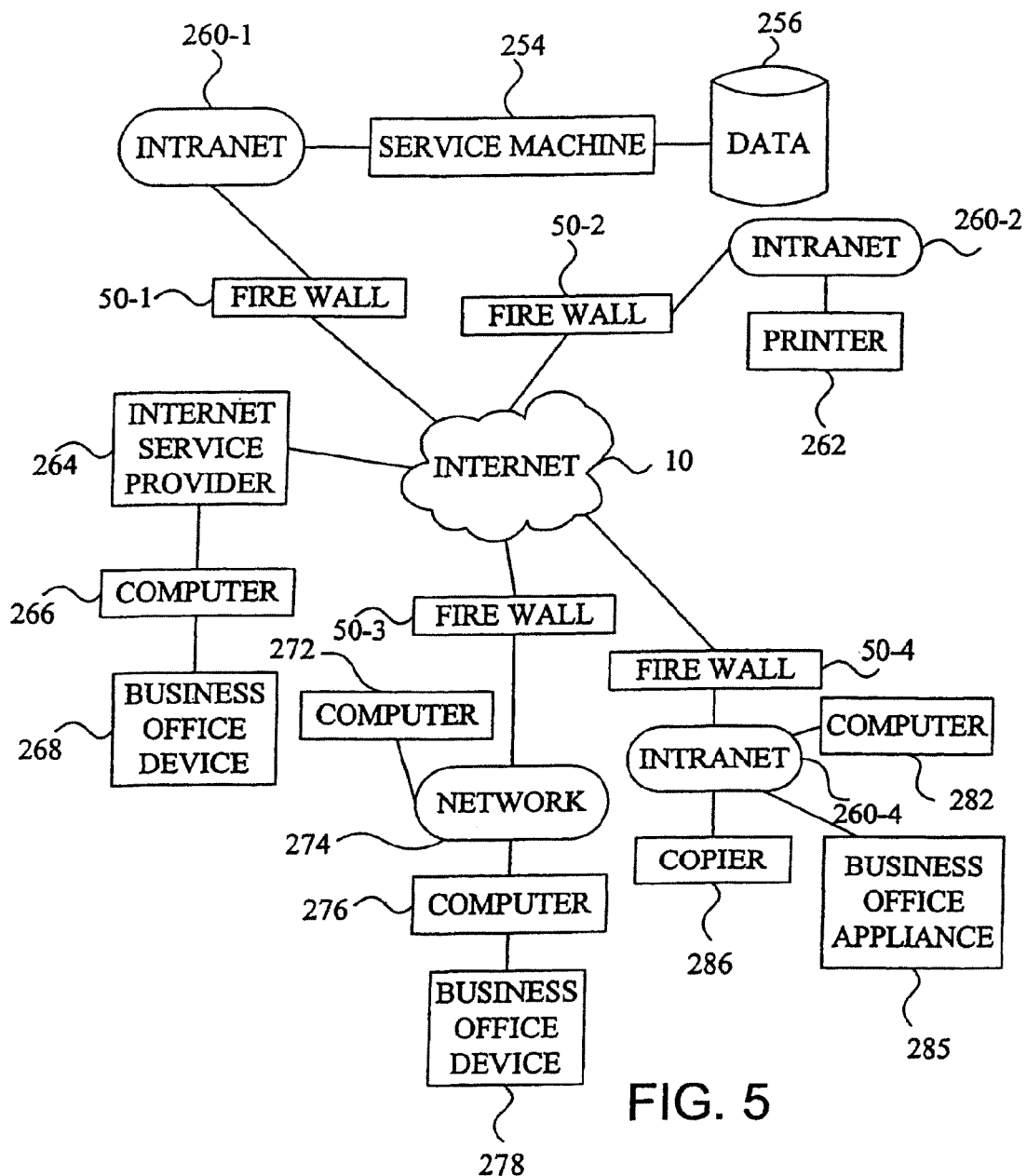
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up the monitored devices, or configuration information such as which components or optional equipment is included with the monitored devices. The service machine 254 may be implemented as the device or computer which requests the monitored devices to transmit data, or which requests that remote control and/or diagnostic tests be performed on the monitored devices. The service machine 254 may be implemented as any type of device, and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264 which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Integrated Services Digital Network (ISDN) line or an Asymmetric Digital Subscriber Line (ADSL), modems which use frame relay communication, wireless modems such as a radio frequency modem, a fiber optic modem, or a device which uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an ethernet or token ring network). Networking software which may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278. Communication between the business office device 278 and the computer 276 may be accomplished using wire-based or wireless methods including, but not limited to, radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification LOA (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired.

Figure 6A:
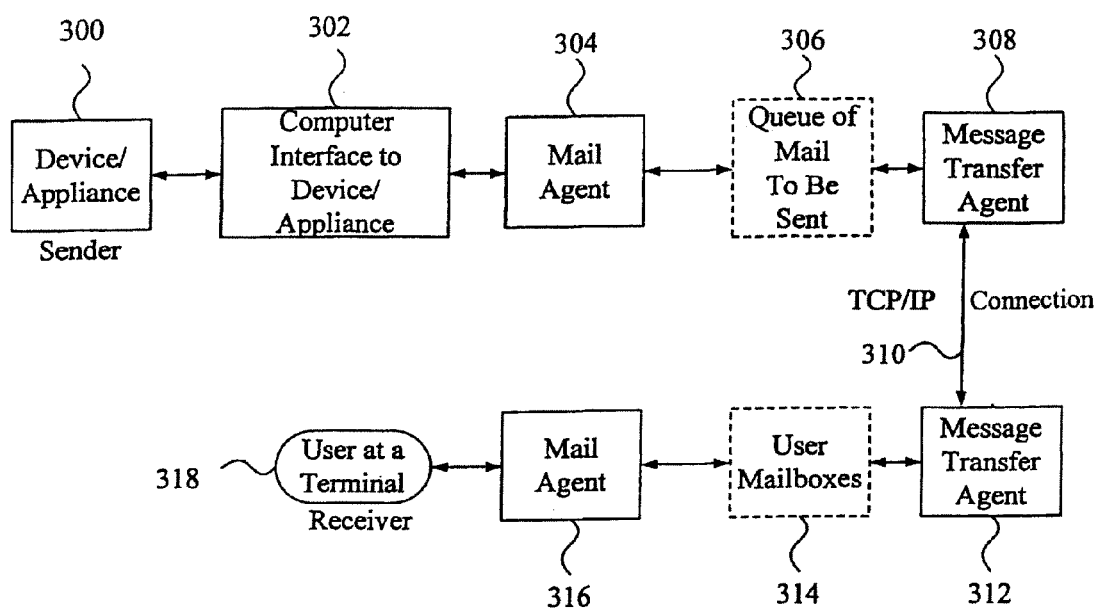
FIG. 6A is a block diagram illustrating a flow of information to and from an application unit using electronic mail.

FIG. 6A illustrates a device/appliance 300 connected to a typical e-mail exchange system which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not be needed to interface with the device/appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment of the present invention, elements 302 and 304 of FIG. 6A reside in the library to monitor the usage of the application unit.

From the message transfer agent 312, e-mail messages are stored in user mailboxes 314 which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include File Transfer Protocol (FTP) and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available which may be used with the present invention. For example, a C++ library function, crypto, is available from Sun Microsystems for use with the Unix operating system. Other encryption and decryption software packages are known and commercially available and may also be used with this invention. One such package is PGP Virtual Private Network (VPN) available from Network Associates. Other VPN software is available from Microsoft Corporation.

Figure 6B:
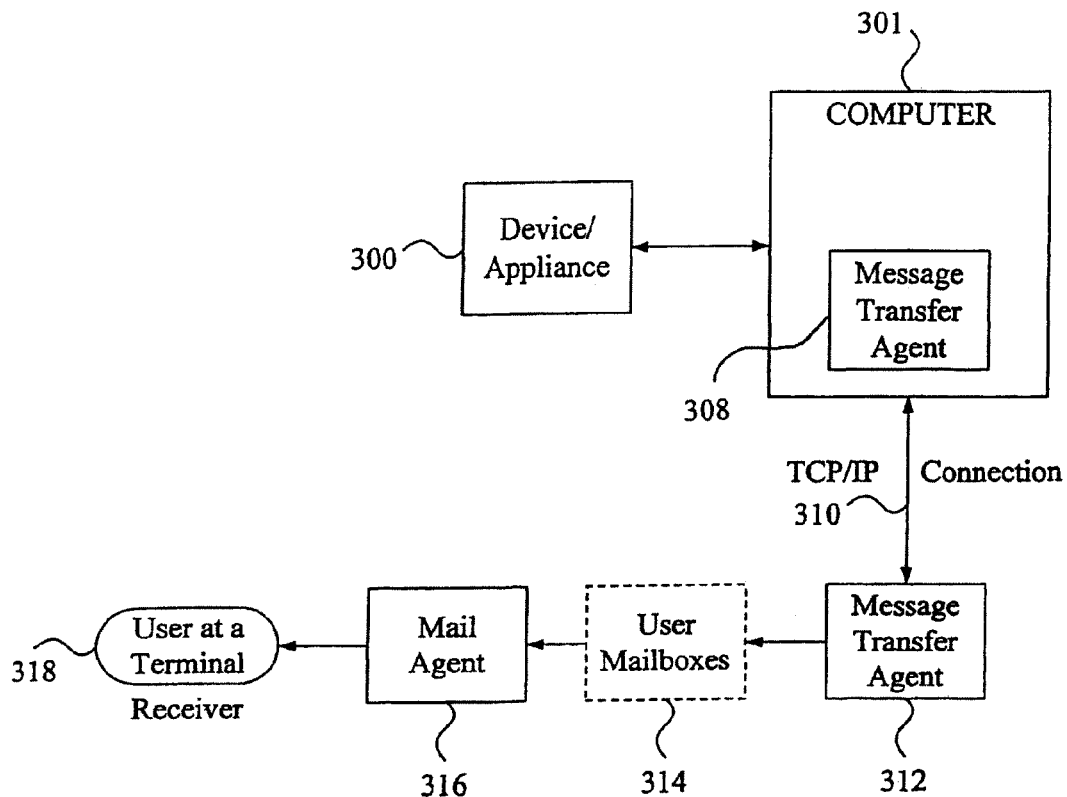
FIG. 6B illustrates an alternative way of communicating using electronic mail in which a computer that is connected to the application unit also serves as a Message Transfer Agent (MTA)

As an alternative to the general structure of FIG. 6A, a single computer may be used which functions as the computer interface 302, the mail agent 304, the mail queue 306 and the message transfer agent 308. As illustrated in FIG. 6B, the device/appliance 300 is connected to a computer 301 which includes the message transfer agent 308.

Figure 6C:
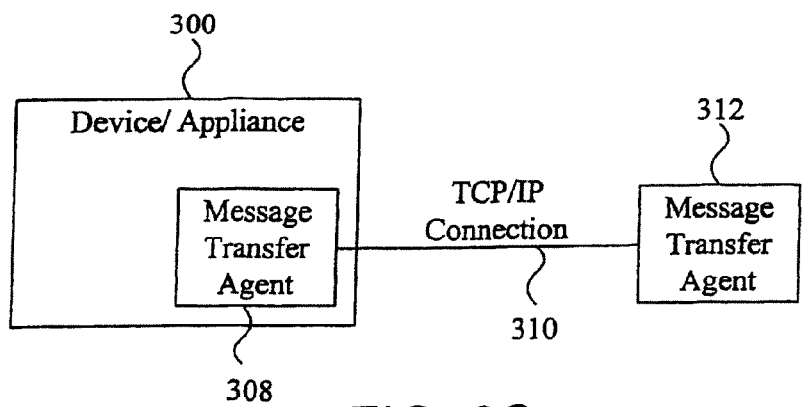
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/P connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
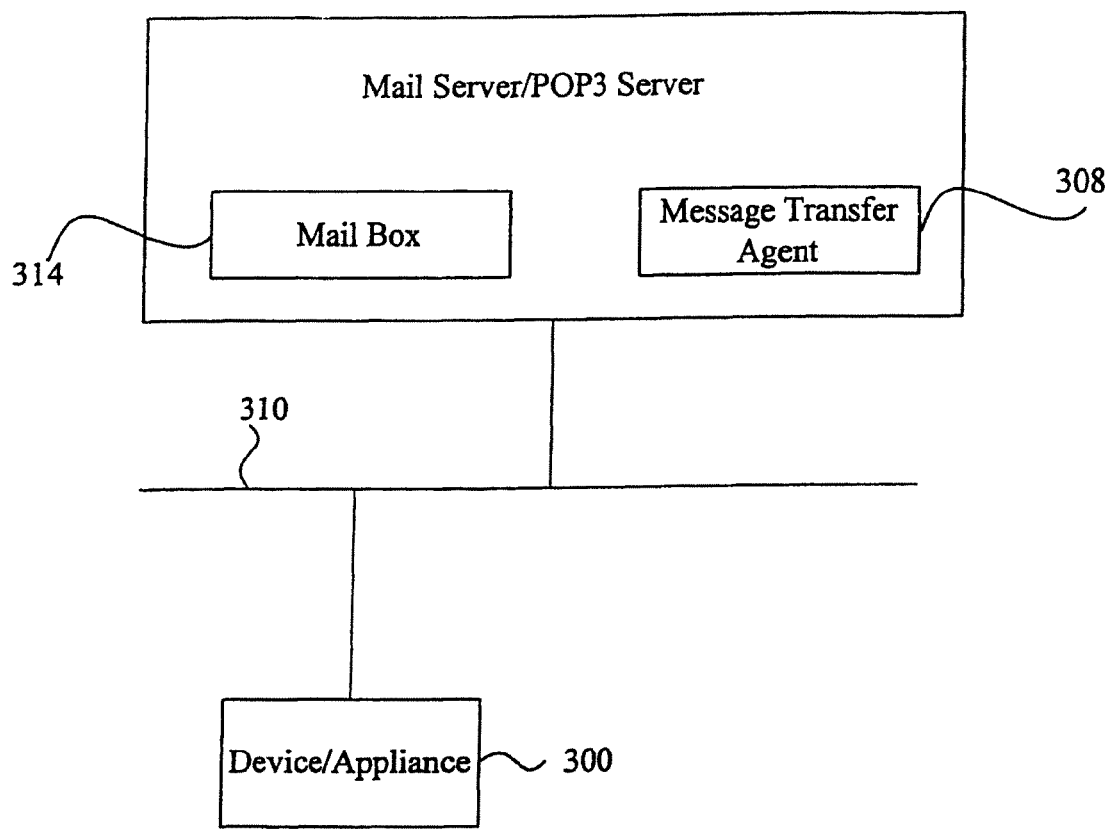
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
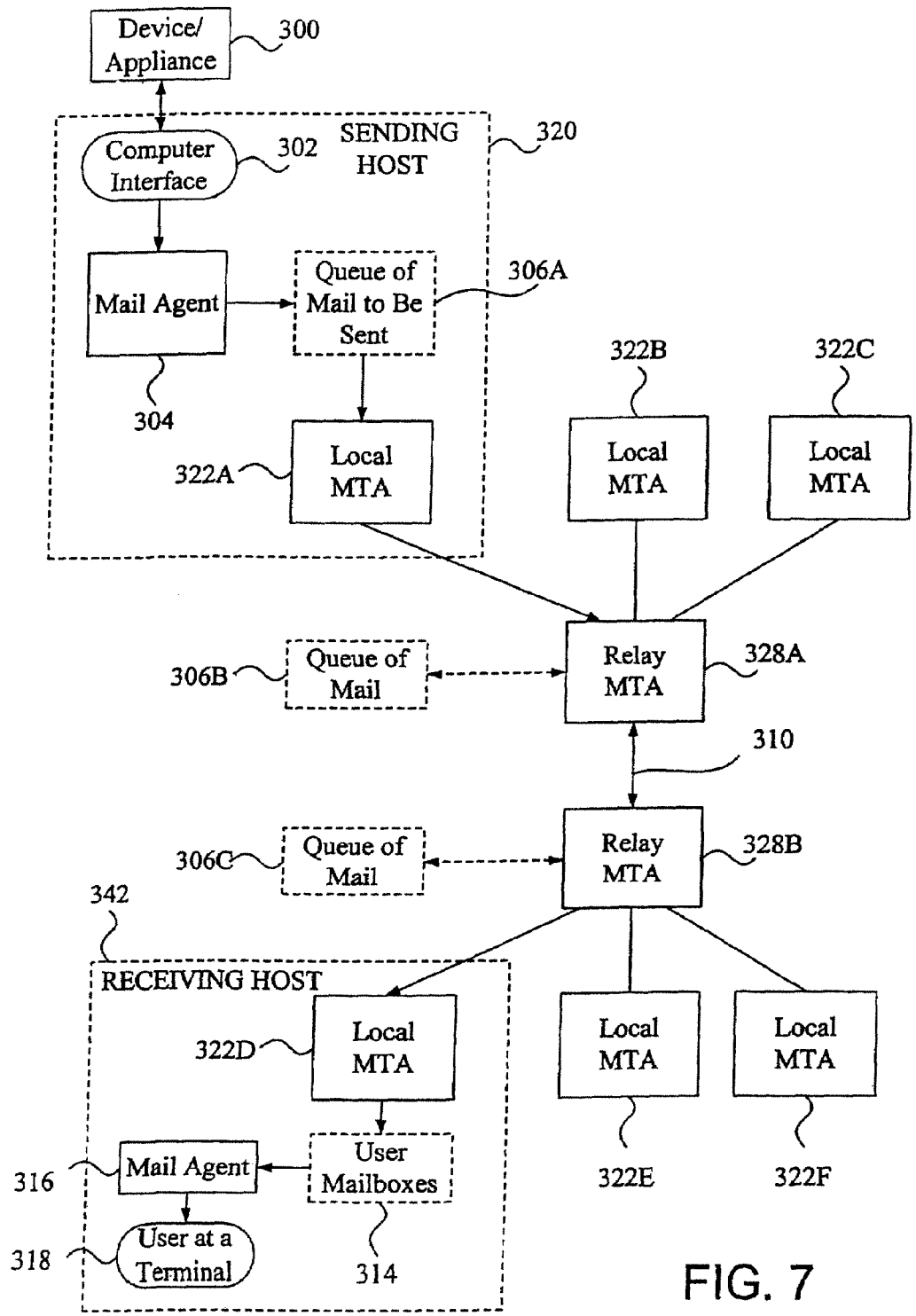
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E and 322E may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
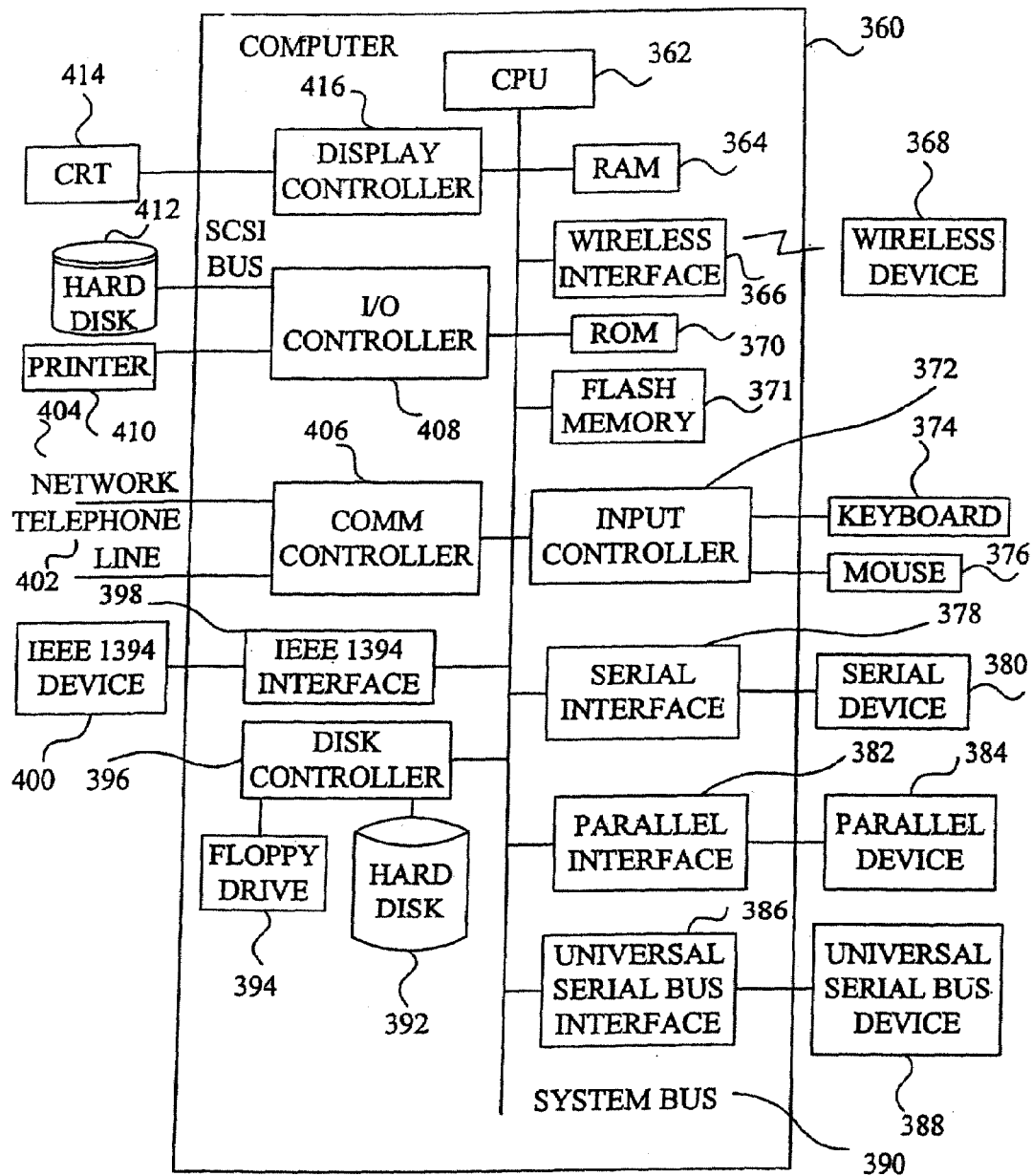
FIG. 8 illustrates an exemplary computer which may be connected to an appliance/device and used to communicate electronic mail messages.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

There is a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
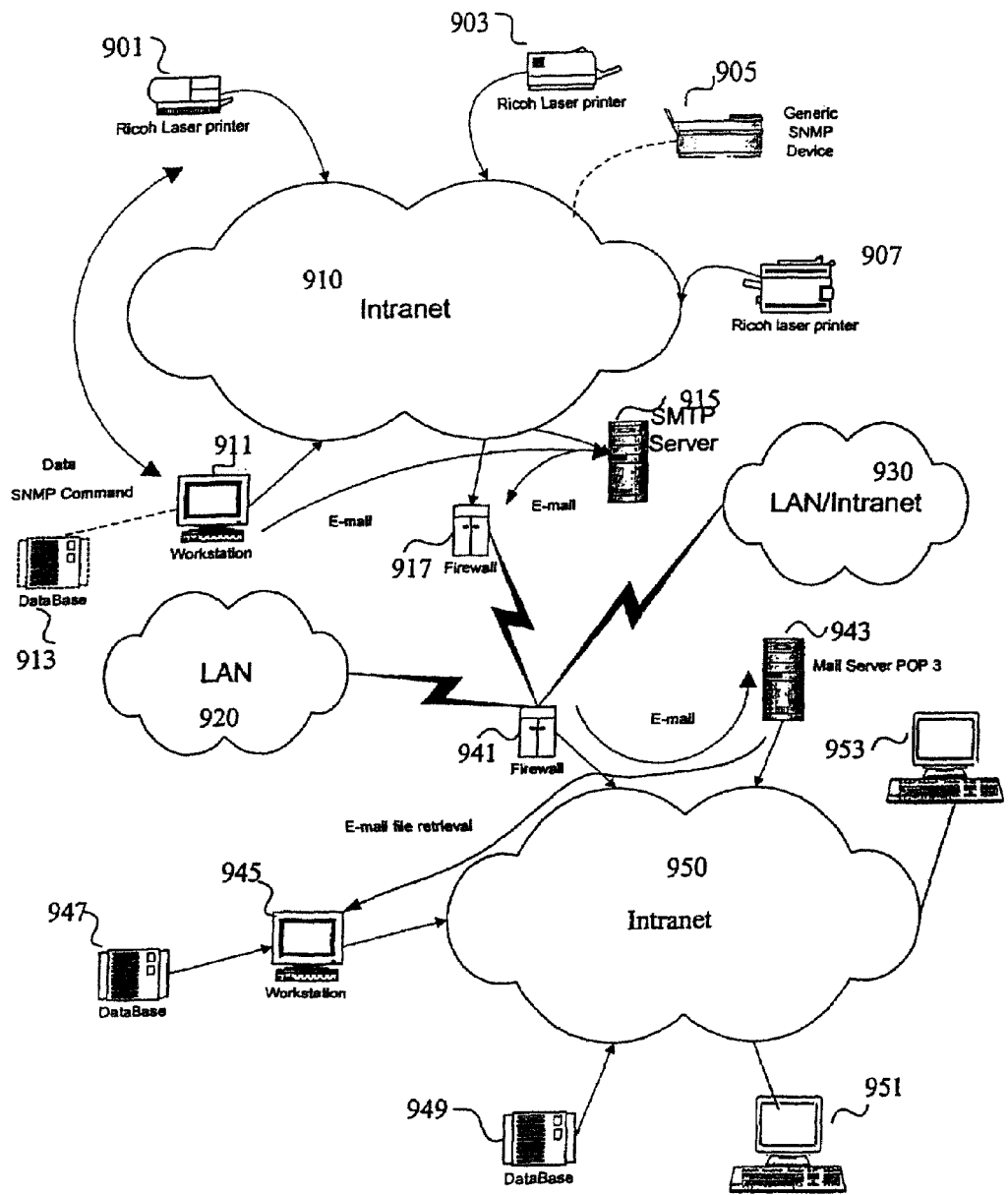
FIG. 9 illustrates an overall system configuration related to the present invention.

FIG. 9 illustrates an application of the present invention. Devices 901, 903, 905 and 907 that are connected to the Intranet 910 are the devices to be monitored locally by a remote monitoring workstation 911 with its database 913. Alternatively, the remote monitoring workstation 911 can function to send the device status information to the central monitoring workstation 945 by polling the information from the monitored devices 901, 903, 905, and 907 and by sending the information through the firewall 917. The remote monitoring workstation 911, therefore, can function either as a monitoring device or as a communication and administrative device between the monitored devices and monitoring device. In FIG. 9, the remote monitoring workstation 911 uses the Simple Network Management Protocol (SNMP) defined by IETF to communicate with the attached devices. SNMP is described in "Managing Internetworks with SNMP, third edition" by Mark A. Miller, P. E., M & T Book, 1999. The entire contents of this reference are incorporated herein by reference. If some of the devices to be monitored do not support SNMP, the remote monitoring workstation 911 can use a different method to obtain the necessary information. After obtaining the necessary information, the remote monitoring workstation 911 uses the Simple Mail Transfer Protocol (SMTP) Server 915 to send out the necessary information to the central monitoring workstation 945 through the Mail Server 943 that supports the Post Office Protocol Version 3 (POP3) (IETF Networking Group Request For Comments [RFC]: 1939). The remote monitoring workstation 911 uses SMTP (SMTP is defined in IETF RFC 821) and possibly Multipurpose Internet Mail Extensions (MIME) to send e-mails. The remote monitoring workstation 911 generates the mail message that is at and above the Application Layer of the TCP/IP model or the ISO seven-layer model, as shown later. Alternatively, the remote monitoring workstation 911 may include an SMTP processor to send out the necessary information using e-mail.

The LAN 920 and intranet 930 send similar information to the central monitoring workstation 945. When the e-mails that contain the monitoring information of devices arrive at the firewall 941 of the intranet 950, the mail is routed to the Mail Server 943 with POP3. The central monitoring workstation 945 periodically accesses the Mail Server 943 to obtain the arrived e-mail, parse the mail and its content via POP3 and stores the necessary information in the database 947. The database 949 contains the additional information of the monitored device characteristics and history. The computers 951 and 953 perform the analysis of obtained data to take the necessary actions. Alternatively, the central monitoring workstation 945 may contain a mail receiving capability, and the firewall may route the e-mail directly to the central monitoring workstation 945.

Figure 10A:
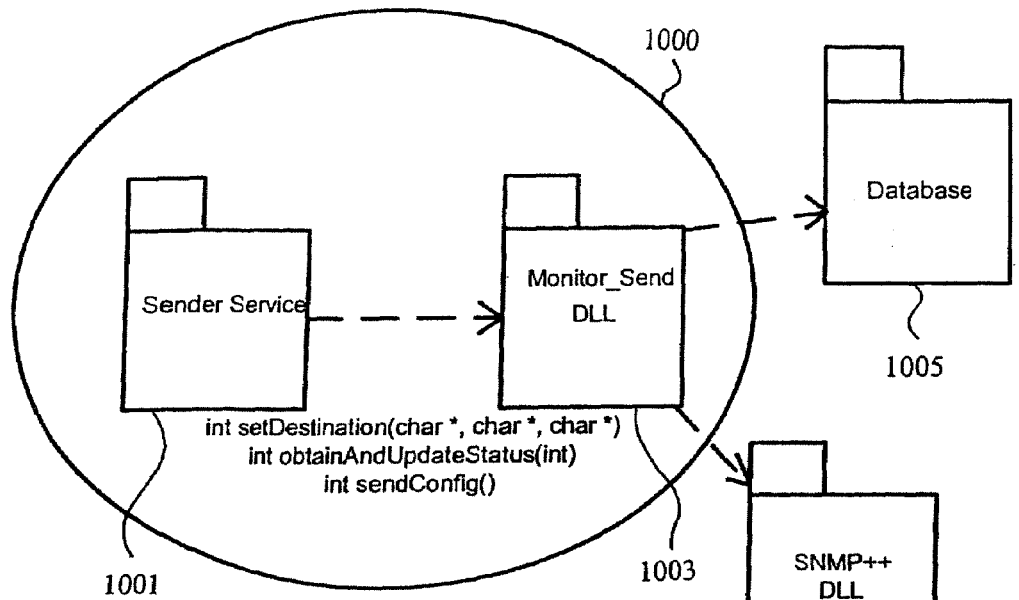
FIG. 10A illustrates a general software architecture of a message sending module.
Figure 10:
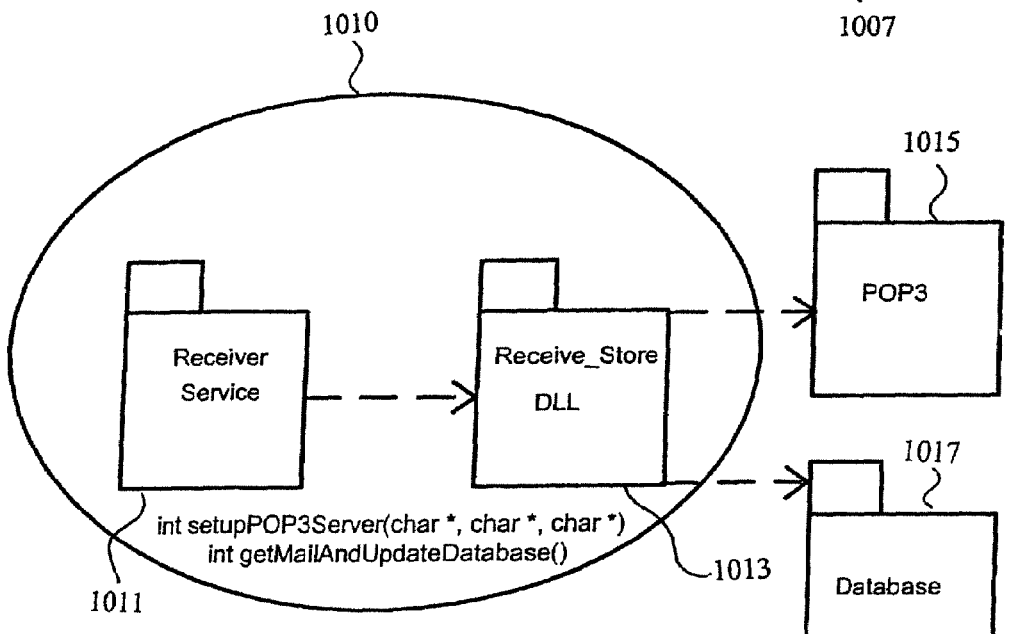
FIG. 10B illustrates a general software architecture of a message receiving module.

FIGS. 10A and 10B illustrate an overall software architecture of the system shown in FIG. 9 according to one embodiment of the present invention. FIG. 10A illustrates the architecture of the software used by the networks that send the e-mails with the information on the monitored devices in FIG. 9 according to one embodiment of the present invention. The Sender Service 1001 module is the system resident software that sets up the destination for the monitored information to be sent, initiates the sending of the configuration and contact information to the destination, and periodically monitors and sends the information to the destination by using the three functions defined in 1000 (i.e., setDestination, obtainAndUpdateStatus, and sendconfig) to trigger the send module, Monitor_Send DLL 1003. The Monitor_Send DLL 1003 module uses two other modules, the Database 1005 module to store the device information and device-related information along with the monitored information that is stored until it is sent out, and the SNMP++ DLL 1007 module that is used to obtain the information from the devices.

FIG. 10B illustrates the architecture of the software used by the receiving side (e.g., intranet 950) in FIG. 9 according to one embodiment of the present invention. The Receiver Service 1011 module is the system resident software that sets up access to the mail server where the monitored information is to be sent, and periodically obtains the monitored information from the mail server through the two functions defined in 1010 (i.e., setupPOP3Server, and getMailAndUpdateDatabase) to trigger the Receive_Store DLL 1013 module. The Receive_Store DLL 1013 module uses two other modules, the Database 1017 module to store device information and device-related information along with the monitored information and the POP3 1015 module to retrieve information from the mail server.

Figure 11:
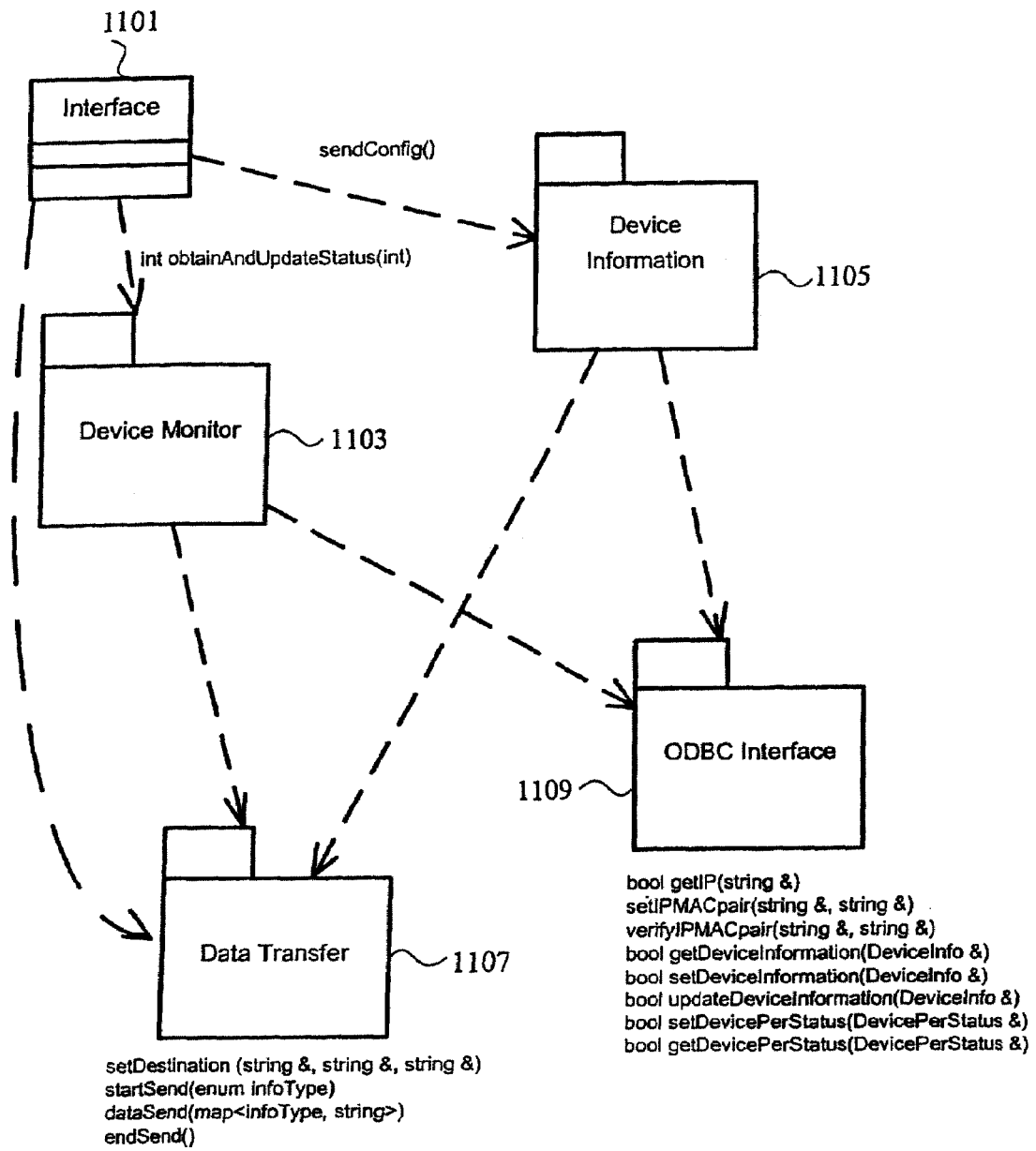
FIG. 11 illustrates a general architecture of a message sending module.

FIG. 11 illustrates the general architecture of the Monitor_Send DLL 1003 module according to one embodiment of the present invention. This part of the system is responsible for monitoring the status of the devices and for sending e-mails containing status and configuration information of the monitored devices. The Interface 1101 module allows any application to use the Monitor_Send DLL 1003 module. For example, the Sender Service 1001 module in FIG. 10A accesses the Monitor_Send DLL 1003 module through the Interface 1101 module. The Device Information 1105 module is responsible for obtaining configuration information from the monitored devices and initiating the sending of the configuration information. The Device Monitor 1103 module is responsible for obtaining status information from the monitored devices and initiating the sending of the status information. The Data Transfer 1107 module is responsible for providing a method through which the status and configuration information is sent. The ODBC Interface 1109 module provides a method to access and store information in a database. Each of the components of the Monitor_Send DLL 1003 module provides interface functions that allow them to perform its tasks. For example, the functions of the Data Transfer 1107 module are provided through four interface functions, setDestination, startSend, dataSend, and endSend.

Figure 12:
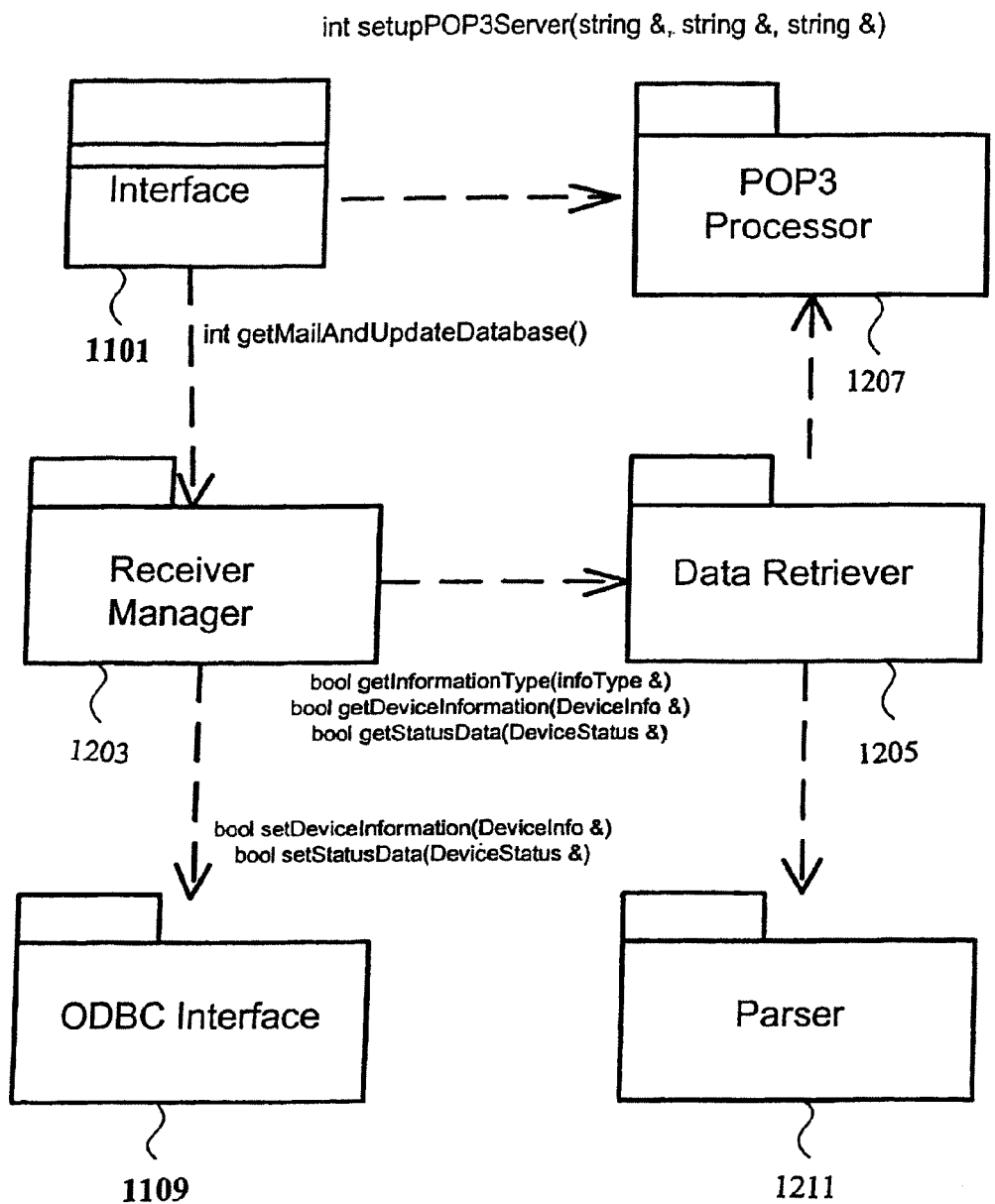
FIG. 12 illustrates a general architecture of a message receiving module.

FIG. 12 illustrates a general architecture of the Receive_Store DLL 1013 module according to one embodiment of the present invention. This part of the system is responsible for retrieving the information that was sent to it by the Monitor_Send DLL 1003 module and storing the information in the database. The Interface 1101 module allows any application to use the Receive_Store DLL 1013 module. For example, the Receiver Service 1011 module in FIG. 10B accesses the Receive_Store DLL 1013 module through the Interface 1101 module. The Receive Manager 1203 module is responsible for obtaining the configuration information and status information of the monitored devices from the POP3 server and storing that information in the database. The Data Retriever 1205 module is responsible for retrieving the data from the POP3 server. The POP3 Processor 1207 module is responsible for accessing the information sent to it by the Monitor_Send DLL 1003 module. The Parser 1211 module is responsible for parsing the information obtained from the POP3 server. The ODBC Interface 1109 module is responsible for storing the information sent to it in a database. Each of the components of the Receive_Store DLL 1013 module provides interface functions that allow them to perform its tasks.

FIG. 13A is a flowchart providing an overview of the functions performed by the Device Information 1105 module in the context of the system diagram of FIG. 9. This process focuses on the sending of configuration information of the monitored devices from the remote monitoring workstation 911 to the central monitoring workstation 945, and not the sending of status information, which is described below in the context of the Device Monitor 1103 module. Configuration information for the monitored devices maintained by the central monitor may be either originally sent, or updated, through the functions performed by the Device Information 1105 module, as will be understood in light of the description provided herein.

As shown in FIG. 13A, the process begins with step S1301 where the database 913 is queried by the remote monitoring workstation 911 to obtain configuration information and IP address information corresponding to the devices being monitored by that particular remote monitoring workstation 911. The process then proceeds to step S1302 where, using the IP address obtained from the database 913, the remote monitoring workstation 911 queries the individual monitored devices using SNMP commands to obtain a device-unique identifier (e.g., a MAC address) for each of the devices being monitored. The process then proceeds to step S1303 where the remote monitoring workstation 911 stores the device-unique identifier in the database. The process then proceeds to step S1304 where the configuration information, including the IP address obtained from the database 913 and the device-unique identifier obtained through SNMP commands, are formatted into a common map structure. The process then proceeds to step S1305 where the configuration information including the device-unique identifier is sent to the central monitoring workstation 945 via an e-mail message through the SMTP server 915. Once the information has been sent, the process ends.

Figure 13B:
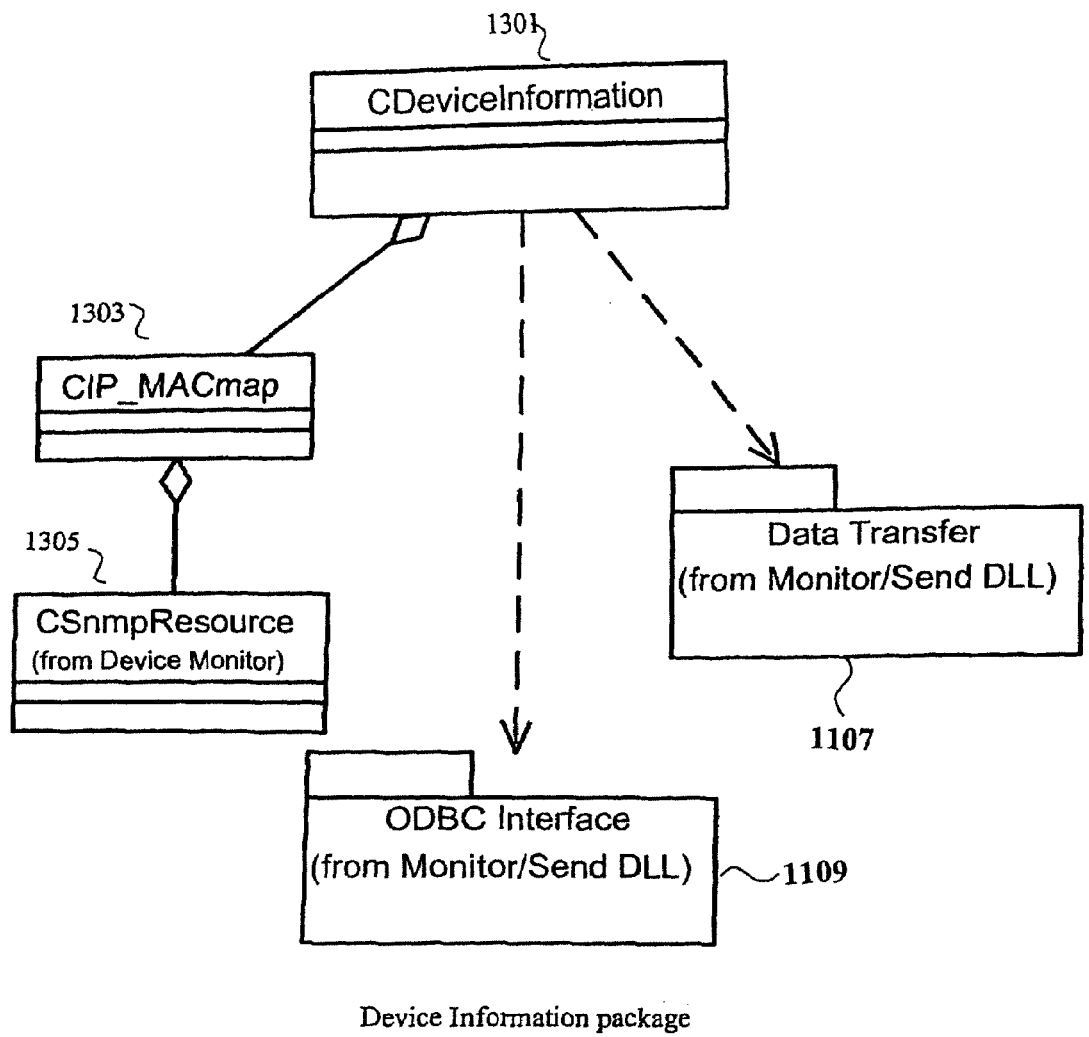
FIG. 13B illustrates a class structure of the device information module.

FIG. 13B is a class diagram illustrating one embodiment of the Device Information 1105 module of FIG. 11 according to the present invention. The Device Information 1105 module is responsible for triggering the Data Transfer 1107 module to start the sending of configuration information, obtaining the device configuration information from the database 913 via the ODBC Interface 1109 module, obtaining a device-unique identifier (e.g., a MAC address) from the monitored SNMP devices and updating the device configuration information in the database 913 to include the device-unique identifier, formatting the device configuration information into a map structure, sending the map structure to the Data Transfer 1107 module, and completing the sending of the configuration information via the Data Transfer 1107 module.

The database 913 is not initially populated with a device-unique identifier for the monitored devices. The Device Information 1105 module is responsible for obtaining this information from the monitored devices based on information that is originally stored in the database (e.g., IP address information), via SNMP commands. The device-unique identifier, obtained directly from the devices, is then populated by the Device Information 1105 module into the database 913.

The map structure used in storing the information to be sent from the remote monitoring workstation 911 to the central monitoring workstation 945 is a standard structure for storing key/value data. Each entry in the map includes a key indicating what the data represents, and a data field containing the value of the data. In one embodiment of the present invention, the key of the map is a string or a number associated with a particular data field, and the data field is a string value. Map structures are included with the standard C++ language, and similar structures, sometimes called a dictionary structure, are included with other standard languages. An example of a populated map structure is shown below as Table 1:

TABLE 1

Example Map Structure Including Configuration Information

| Key | Value (Data) |
|---|---|
| "Manufacturer" (or 100) | "Xerox" |
| "Model" (or 101) | "DocuPrint N4025" |
| "SerialNumber" (or 102) | "PF4-027955" |
| "MACAddress" (or 103) | "00 00 AA 79 07 76" |
| "IP Address" (or 104) | "172.30.4.53" |
| "CompanyName" (or 105) | "Ricoh Corporation" |
| "Street" or (106) | "1996 Lundy Ave" |
| "City" (or 107) | "San Jose" |
| "State" (or 108) | "CA" |
| "ZipCode" (or 109) | "95131" |
| "Location" (or 110) | "Lab" |
| "ContactPerson" (or 111) | "John Smith" |
| "PhoneNumber" (or 112) | "4085551212" |

The Device Information 1105 module contains two classes, CDeviceInformation 1301 and CIP_MACmap 1303. The CDeviceInformation 1301 class is responsible for obtaining the configuration information from the database 913, and initiating the sending of the information through e-mail from the remote monitoring workstation 911 to the central monitoring workstation 945. The CDeviceInformation 1301 class interacts with the database 913 via the ODBC Interface 1109 module to obtain the configuration information, and uses the Data Transfer 1107 module to transmit the configuration information to the central monitoring workstation 945.

The CIP_MACmap 1303 class makes use of the CSnmpResource 1305 class to obtain a physical address (e.g., a MAC address) from the monitored SNMP devices. The MAC address is used to uniquely identify the monitored devices within the database 947 maintained by, for example, the central monitoring workstation 945. While an IP address, for example, may uniquely identify a monitored device among the devices connected to a particular network monitored by the remote monitoring workstation 911, that address may not be unique among all of the networks being monitored by the central monitoring workstation 945. It is for this reason that, in this example, a MAC address is used to provide a globally unique identification for a particular device that can be relied on by the central monitoring workstation 945.

If other device-unique identification is available, the class structure shown in FIG. 13B can be modified to accommodate that unique identification.

Figure 14:
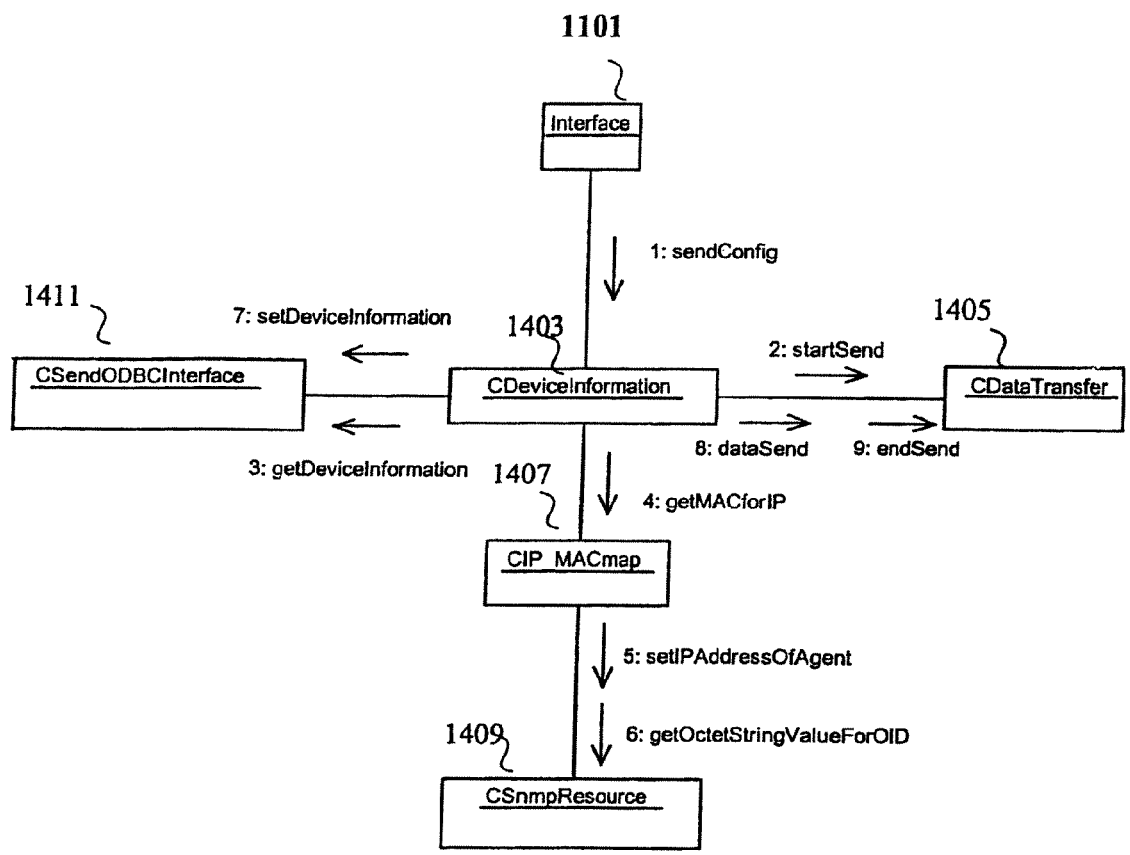
FIG. 14 is a collaboration diagram for the device information module.

FIG. 14 is a collaboration diagram illustrating the interaction among the classes of the Device Information 1105 module shown in FIG. 13B to obtain and send configuration information of a monitored device from the remote monitoring workstation 911 to the central monitoring workstation 945. As shown in FIG. 14, the process is initiated by a call to the sendConfig( ) method of the CDeviceInformation 1403 class by the Interface 1101. In response, the CDeviceInformation 1403 class calls the startSend( ) method of the CDataTransfer 1405 class to initiate a communication link for sending of the e-mail message that will contain the configuration information. The CDeviceInformation 1403 class then calls the getDeviceInformation( ) method of the CSendODBCInterface 1411 class to obtain the configuration information, including the IP address, of the monitored device from the database. The CDeviceInformation 1403 class then calls the getMACforIP( ) method of the CIP_MACmap 1407 class to obtain a physical address (e.g., the MAC address) for the monitored devices based on the IP address that was obtained from the database. In turn, the CIP_MACmap 1407 class calls the setIPAddressOfAgent( ) and getOctetStringValueForOID( ) methods of the CSnmpResource 1409 class to query the monitored device based on its IP address to receive its physical address through the appropriate SNMP functions. Next, the CDeviceInformation 1403 class calls the setDeviceInformation( ) method of the CSendODBCInterface 1411 class to store the configuration information in the database.

The CDeviceInformation 1403 class then calls the dataSend( ) method of the CDataTransfer 1405 class to send the configuration information, along with the physical address information, to the central monitoring workstation 945. Finally, the CDeviceInformation 1403 class calls the endSend( ) method of the CDataTransfer 1405 class to complete the sending of the configuration information.

Figure 15A:
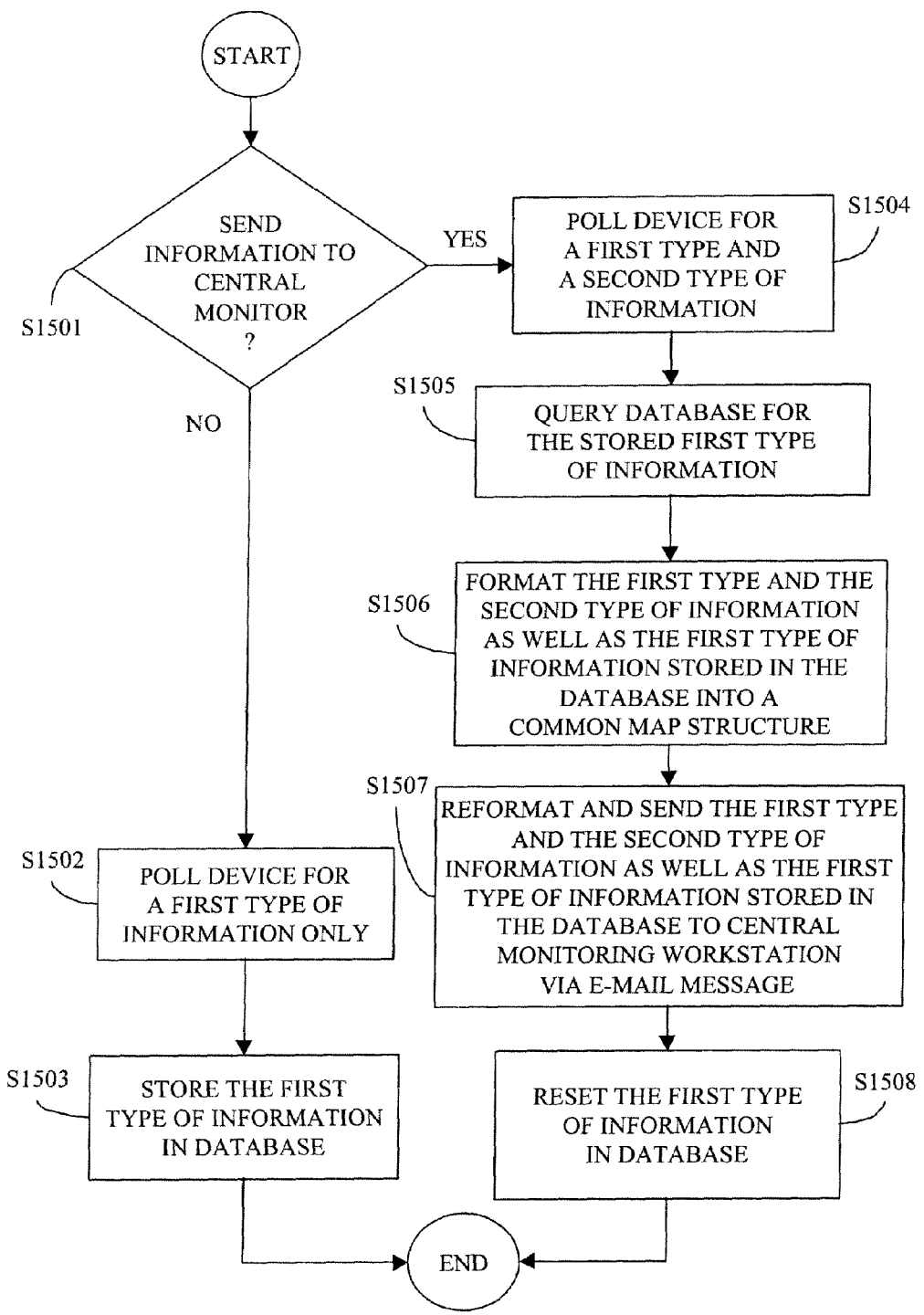
FIG. 15A is a flowchart illustrating a process implemented by the device monitor module shown in FIG. 11.
Figure 15:
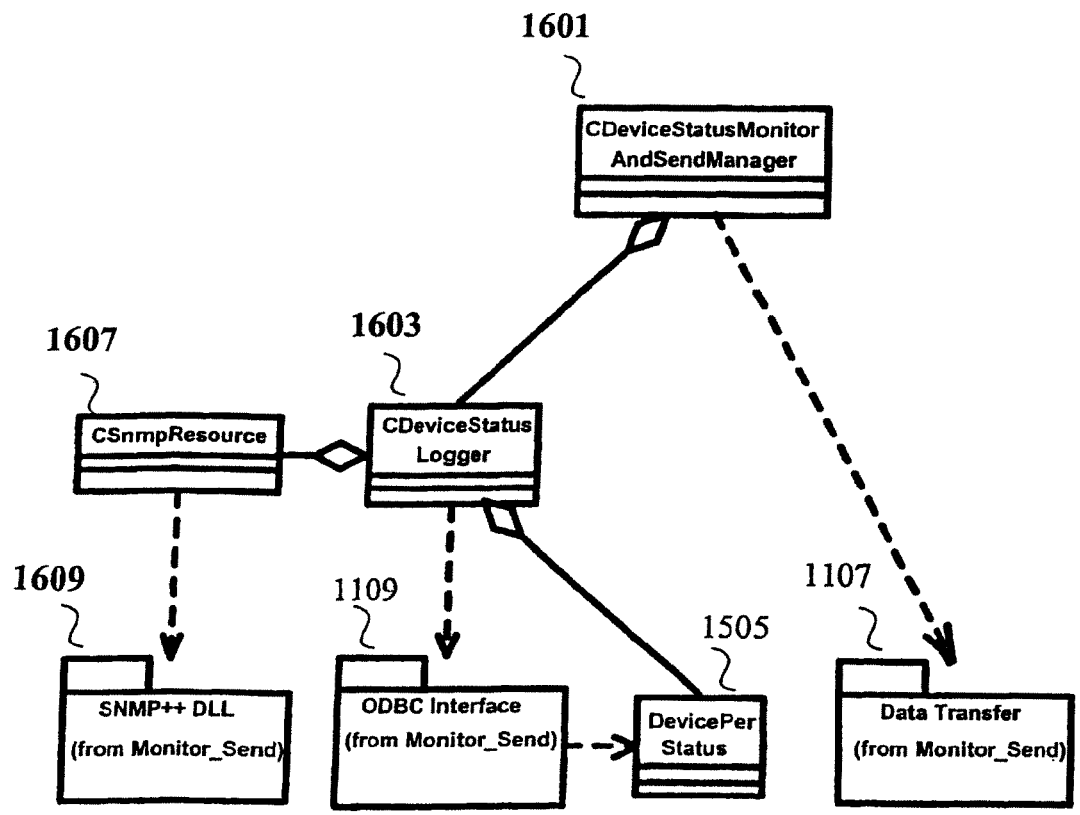
FIG. 15B illustrates a class structure of the device monitor module.

FIG. 15A is a flowchart providing an overview of the functions performed by the Device Monitor 1103 module in the context of the system diagram of FIG. 9. This process focuses on the collection, storing, and sending of information of the monitored devices from the remote monitoring workstation 911 to the central monitoring workstation 945 as an e-mail message via the SMTP server 915.

As shown in FIG. 15A, the process begins with step S1501 where it is determined whether information is to be sent to the central monitoring workstation 945. In one embodiment of the present invention, some information is sent from the remote monitoring workstation 911 to the central monitoring workstation 945 at a different frequency (e.g., less frequently) than a frequency that the monitored devices are polled for status. If it is determined that the collected information is not to be sent to the central monitoring workstation 945 (i.e., "NO" at step S1501), the process proceeds to step S1502 where the monitored devices are polled for a first type of information only.

The first type of information may include, for example, certain status information that may change states more frequently than information is reported to the central monitoring workstation. A second type of information may include a different class of status information, for example, a counter, a level indicator, or a configuration setting of a monitored device. For this second type of information, interim values between reporting periods are not of interest. As would be understood, it is quite possible that, depending on the frequency with which information is sent to the central monitoring workstation 945, status information corresponding to the first type of information, for example, an error condition, could have been corrected between transmissions to the central monitoring workstation 945. For that reason, it is helpful to store the first type of information, so that when information is sent to the central monitoring workstation 945, it can be reported that, in this example, a particular error condition, while not necessarily still present, had occurred since the last time information was sent. Accordingly, when the information, including both the first type and the second type of information, is sent to the central monitoring workstation 945, the first type of information stored in the database 913 is queried from the database 913 and sent along with the most recent information. Then, those values in the database 913 are reset to clear any information that had been stored leading up to the transmission to the central monitoring workstation 945.

Returning to FIG. 15A, once the first type of information has been collected from the network device, the process proceeds to step S1503 where the first type of information is stored in the database 913 by the remote monitoring workstation 911. After the first type of information is stored in the database 913, the process ends.

If, on the other hand, it is determined that information is to be sent to the central monitoring workstation 945 (i.e., "YES" at step S1501), the process proceeds to step S1504 where the monitored devices are polled for both the first type of information and the second type of information. Once this information is obtained, the process proceeds to step S1505 where the database is queried for the stored first type of information previously collected. The process then proceeds to step S1506 where both the first type and the second type of information just collected, as well as the first type of information retrieved from the database, is formatted into a common map structure. This is the same map structure that was used by the Device Information 1105 module to send the configuration information. The process then proceeds to step S1507 where both the first type and second type of information is sent by the remote monitoring workstation 911 to the central monitoring workstation 945 as an e-mail message via the SMTP server 915. After the status information has been sent by the remote monitoring workstation 911, the process proceeds to step S1508 where, as discussed above, the remote monitoring workstation 911 resets the values corresponding to the first type of information stored in the database 913 to clear any conditions that may have been recorded leading up to the sending of the information. Once the database 913 values are reset, the process ends.

FIG. 15B is a class diagram illustrating one embodiment of the Device Monitor 1103 module of FIG. 11 according to the present invention. The Device Monitor 1103 module is responsible for logging and maintaining information about the network devices. This Device Monitor 1103 module is also responsible for ensuring that the information is sent to the central monitoring workstation 945. If the information is not to be sent upon being collected, the Device Monitor 1103 module obtains and stores only certain types of information (e.g., occurrence of no toner, door open, jam, etc.) in the database 913. If the information is to be sent upon being collected, the Device Monitor 1103 module obtains other types of information, including, for example, less volatile status information. The Device Monitor 1103 module includes three classes, CDeviceStatusMonitorAndSendManager 1601, CDeviceStatusLogger 1603, and CSnmpResource 1607.

The CDeviceStatusMonitorAndSendManager 1601 class is responsible for obtaining the information from the monitored devices and sending the information to the central monitoring workstation 945. The CDeviceStatusMonitorAndSendManager 1601 class uses the Data Transfer 1107 module discussed above to send the information to the central monitoring workstation 945.

The CDeviceStatusLogger 1603 class is responsible for logging and maintaining the information of the monitored devices. The CDeviceStatusLogger 1603 class obtains and stores information of the monitored devices in the database 913 using the ODBC Interface 1109 module discussed above. The CDeviceStatusLogger 1603 class includes the DevicePerStatus structure for storing the first type of information of the monitored devices in the database 913. In one embodiment of the present invention, only this first type of information is stored in the database.

The CSnmpResource 1607 class is responsible for providing the network management protocol (e.g., SNMP) which provides the capability for collecting the information from the monitored devices. The CSnmpResource 1607 class uses the SNMP++ DLL 1609 to implement the Simple Network Management Protocol to gather the information from the monitored devices.

Figure 16:
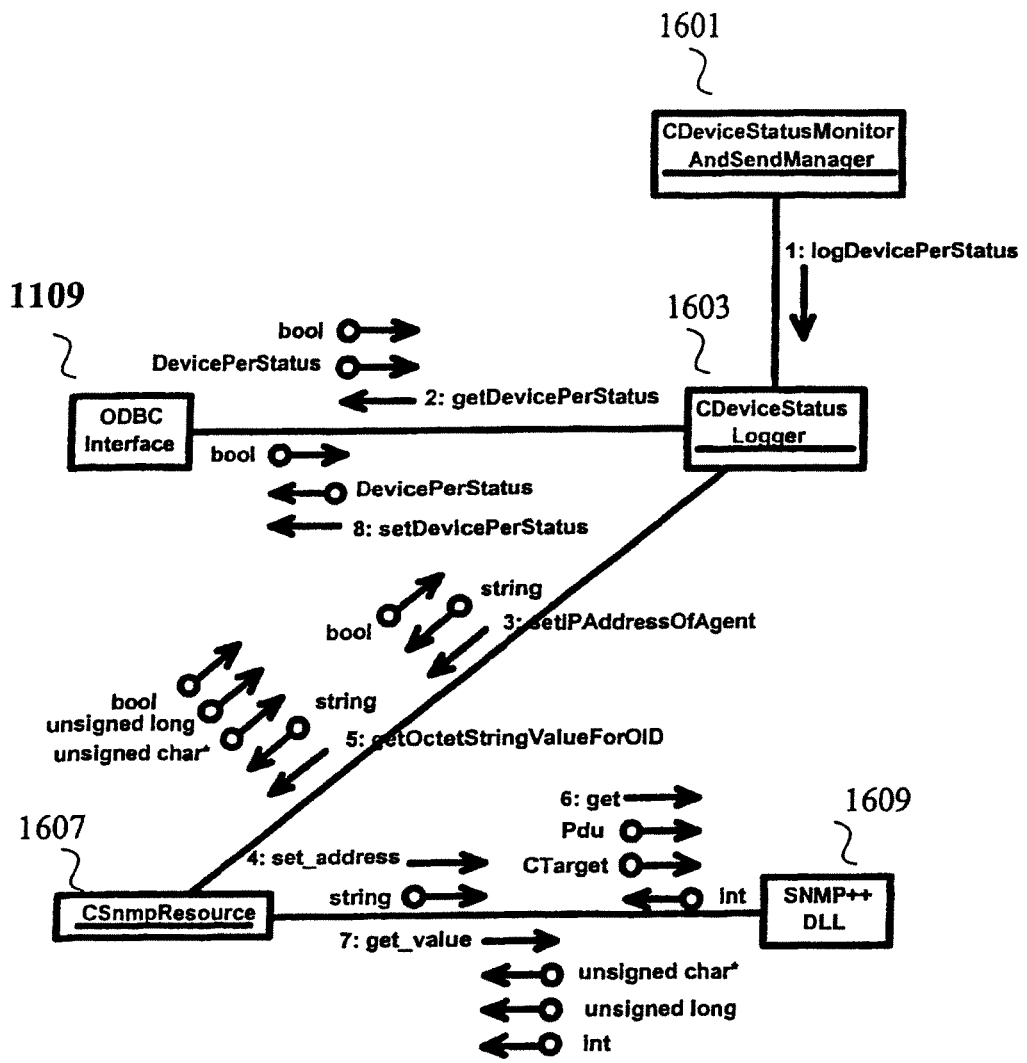
FIGS. 16, 17 and 18 are collaboration diagrams for the device monitor module.

FIG. 16 is a collaboration diagram illustrating the interaction among the classes of the Device Monitor 1103 module to obtain and store the first type of information from the monitored devices. As discussed above, if the information collected from the monitored devices is not to be sent to the central monitoring workstation 945 upon collection, only this first type of information is collected and stored in the database 913. As shown in FIG. 16, the process is initiated by the CDeviceStatusMonitorAndSendManager 1601 class invoking the logDevicePerStatus( ) method of the CDeviceStatusLogger 1603 class to initiate the collection and storing of the first type of information of the monitored devices. The CDeviceStatusLogger 1603 class then calls the getDevicePerStatus( ) method of the ODBC Interface 1109 module to obtain the latest information of the monitored devices, including the IP addresses of the devices, from the database 913. Next, the CDeviceStatusLogger 1603 class calls the setIPAddressOfAgent( ) method of the CSnmpResource 1607 class which, in turn, calls the set_address( ) method of the SNMP++ DLL 1609 to establish an IP address of a device from which the first type of information is to be collected. Next, the CDeviceStatusLogger 1603 class calls the getOctetStringValueForOID( ) method of the CSmnpResource 1607 class which, in turn, calls the get( ) method and the get_value( ) method of the SNMP++ DLL 1609 to obtain the latest information of the monitored devices via SNMP using the IP address of the device. Once the information has been returned, the CDeviceStatusLogger 1603 class calls the setDevicePerStatus( ) method of the ODBC Interface 1109 module to store the information of the monitored devices in the database 913 using the DevicePerStatus 1505 structure.

Figure 17:
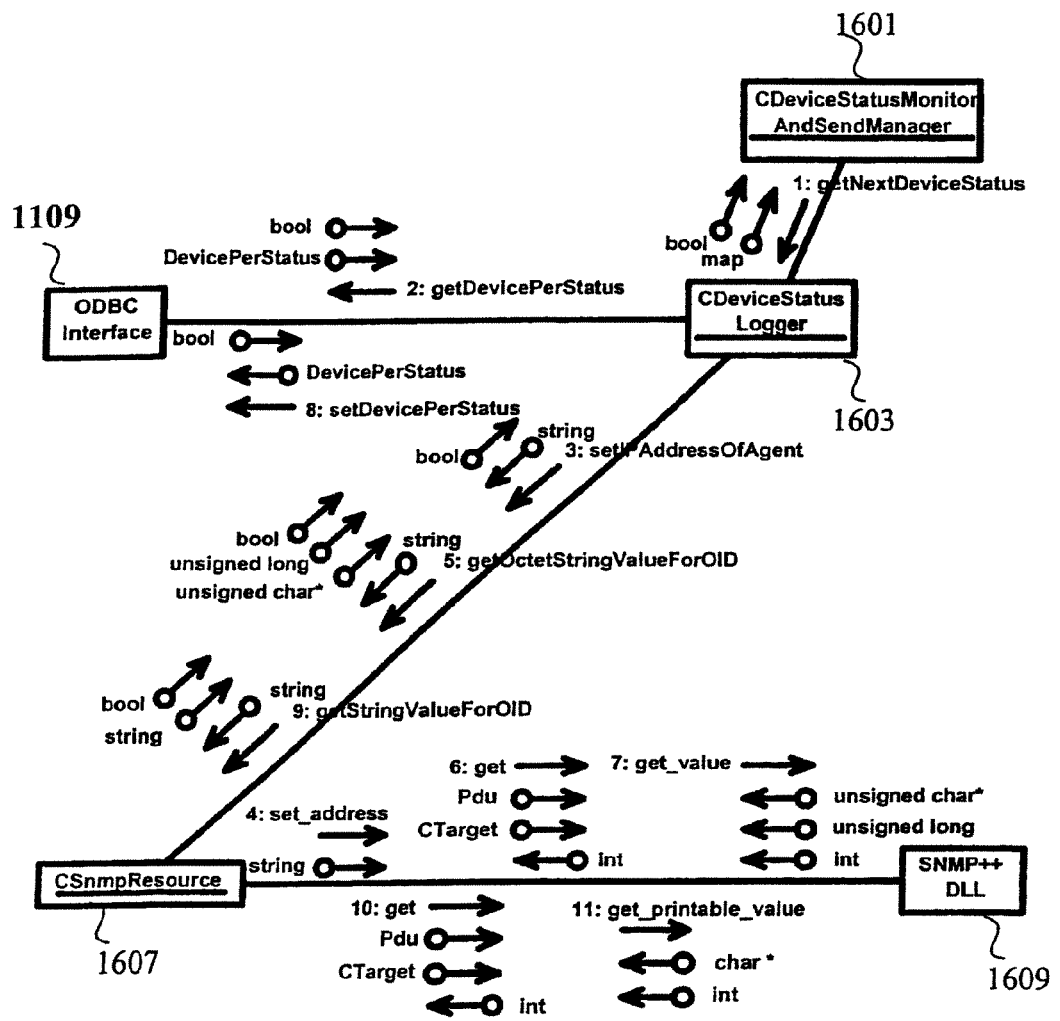

FIG. 17 is a collaboration diagram illustrating the interaction among the classes of the Device Monitor 1103 module to obtain both a first type and a second type of information from the monitored devices and to reset the values corresponding to the first type of information stored in the database 913 for each monitored device. As discussed above, if the information collected from the monitored devices is to be sent to the central monitoring workstation 945 upon collection, both the first type of information and the second type of information is collected. As shown in FIG. 17, the process is initiated by the CDeviceStatusMonitorAnd-SendManager 1601 class invoking the getNextDeviceStatus( ) method of the CDeviceStatusLogger 1603 class to initiate the collection of the information (both the first type, and the second type of information) of the monitored devices. Steps 2-8 in collecting both types of information are the same as steps 2-8 described above (i.e., the calls to getDevicePerStatus( ), setIPAddressOfAgent( ), set-Address( ), getOctetStringValueForOID( ), get( ), get_value( ), and setDevicePerStatus( ) in the context of FIG. 16 for collecting only the first type of information. However, the call to the setDevicePerStatus( ) method of the ODBC Interface 1109 module in this case (i.e., step 8) is used to reset the values corresponding to the first type of information stored in the database.

After resetting the values in the database, the CDeviceStatusLogger 1603 class calls the getStringValueForOID( ) method of the CSnmpResource 1607 class which, in turn, calls the get( ) and get_printable_value( ) methods of the SNMP++ DLL 1609 module to obtain the second type of information from the monitored devices via SNMP commands.

Figure 18:
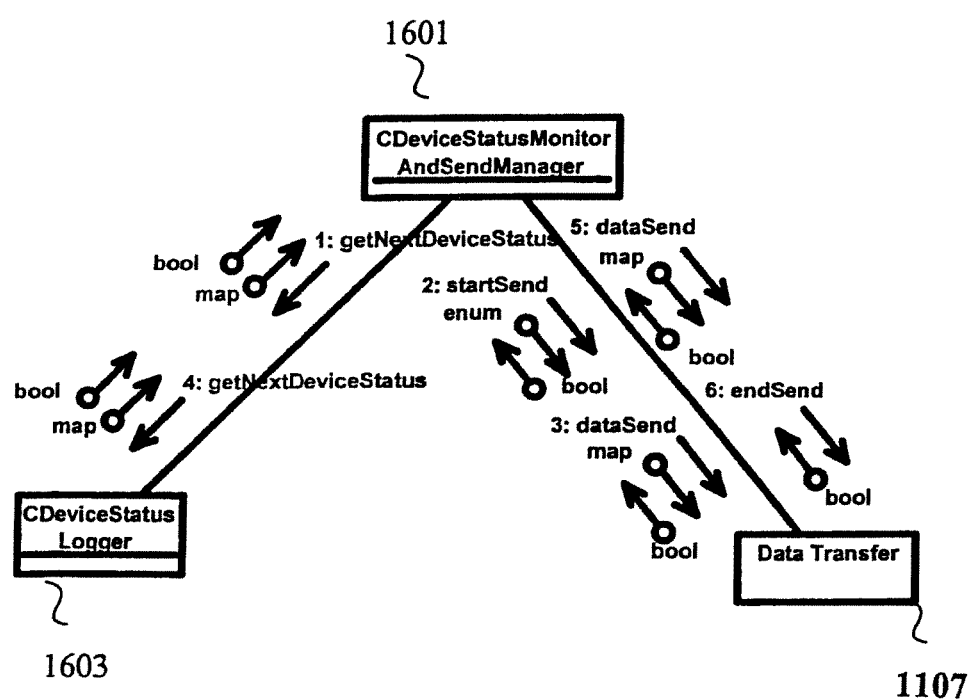

FIG. 18 is a collaboration diagram illustrating the interaction among the classes of the Device Monitor 1103 module to send both the first type and second type of information of the monitored devices to the central monitoring workstation 945. As shown in FIG. 18, the process is initiated by the CDeviceStatusMonitorAndSendManager 1601 class invoking the getNextDeviceStatus( ) method of the CDeviceStatusLogger 1603 class to obtain the information of the monitored devices as discussed above in the context of FIG. 17. Next, the CDeviceStatusMonitorAndSendManager 1601 class calls the startSend( ) and dataSend( ) methods of the Data Transfer 1107 module to initiate the sending of the information to the central monitoring workstation 945. Then, the CDeviceStatusMonitorAndSendManager 1601 class iteratively calls the getNextDeviceStatus( ) method of the CDeviceStatusLogger 1603 class to obtain information from a monitored device, followed by a call to the dataSend( ) method of the CDataTransfer 1405 class, shown in FIG. 19C, of the Data Transfer 1107 module to send the information for a particular monitored device to the central monitoring workstation 945. Once information has been sent for all of the monitored devices, the CDeviceStatusMonitorAndSendManager 1601 class calls the endSend( ) method of the CDataTransfer 1405 class, shown in FIG. 19C, of the Data Transfer 1107 module to complete the sending of the information.

Figure 19A:
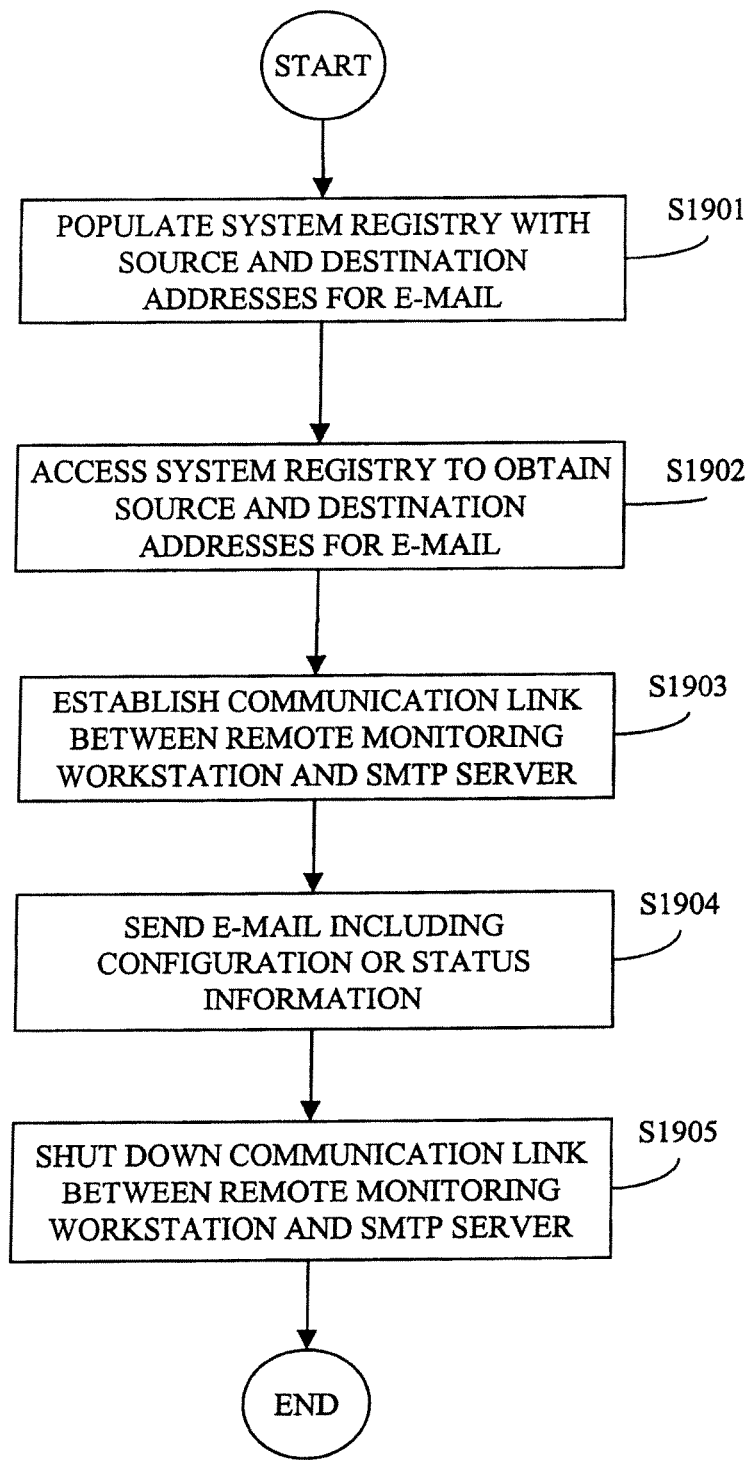
FIG. 19A is a flowchart illustrating a process implemented by the data transfer module shown in FIG. 11.

FIG. 19A is a flowchart providing an overview of the functions performed by the Data Transfer 1107 module in the context of the system diagram of FIG. 9. This process focuses on the Data Transfer 1107 module responsible for sending the configuration and status information, and not the collection of the configuration and status information to be sent, as is described above in the context of the Device Information 1105 module and the Device Monitor 1103 module, respectively.

As shown in FIG. 19A, the process begins with step S1901 where the system registry of the remote monitoring workstation 911 is populated with a source address and a destination address for e-mails transferring status information of the monitored devices. In this example, the source address will be the e-mail address of the remote monitoring workstation 911, and the destination address will be the e-mail address of the central monitoring workstation 945. Once the source and destination addresses have been populated in the system registry of the remote monitoring workstation 911, the transfer of information may begin.

The process then proceeds to step S1902 where a transfer of information commences. In step S1902, the remote monitoring workstation 911 accesses its system registry to obtain source and destination e-mail address information that will be used to populate header information for an e-mail message originating from the remote monitoring workstation 911 and having a destination of the central monitoring workstation 945.

Once the source and destination information has been obtained, the process proceeds to step S1903 where a communication link is established between the remote monitor workstation 911 and a Simple Mail Transfer Protocol (SMTP) Server 915. Once the communication link has been established, the process proceeds to step S11904, where the configuration or status information is sent as an e-mail message from the remote monitoring workstation 911 to the SMTP server 915 via the communication link. The SMTP server 915 will route the e-mail message to the appropriate recipient, in this case, the central monitoring workstation 945. In one embodiment of the present invention, the remote monitoring workstation 911 sends the configuration or status information as a Multipurpose Internet Mail Extensions (MIME) attachment to the Internet e-mail message. As discussed above, the configuration or status information, prior to sending it to the central monitoring workstation 945, is maintained in the database 913. Once the configuration or status information has been sent, the process proceeds to step S1905, where the remote monitoring workstation 911 will shut down the communication link between itself and the SMTP Server 915. Once the communication link has been shut down, the process ends.

FIG. 19B is a flowchart describing in further detail the processing performed in sending configuration or status information as an attachment to an e-mail message (e.g., the process performed in step S1904 of FIG. 19A) according to one embodiment of the present invention. As shown in FIG. 19B, the sending the configuration or status information begins with step S1910 where the configuration or status information in the map structure is formatted to be sent. The structure of the map is such that either configuration or status information data may be stored in the map. Once the data to be sent from the remote monitoring workstation 911 to the central monitoring workstation 945 has been formatted, the process proceeds to step S1911 where the data is encrypted. The Data Transfer 1107 module is configured to allow for a level of encryption for a particular application to match that application's needs without impacting the interface of the Data Transfer 1107 module. Once the data is encrypted, the process proceeds to step S1912 where the data is encoded. Once the data has been encrypted and encoded, the process proceeds to step S1913 where the data is sent via the communication link described above, for example, as a MIME attachment to an e-mail message. Once the data has been sent, the process ends.

The transfer of configuration or status information from the remote monitoring workstation 911 to the central monitoring workstation 945 has been described in the context of FIGS. 19A and 19B as using a store-and-forward protocol. Using a store-and-forward approach, for example, SMTP and POP3, the e-mail message is sent via the SMTP server 915 to a mail server, for example mail server POP3 943, in FIG. 9. The mail server POP3 will store the e-mail message until it is retrieved by the intended recipient, which, in the example discussed above, is the central monitoring workstation 945. When the central monitoring workstation 945 connects to the mail server POP3 943, the mail server POP3 will forward all messages it has stored that have the central monitoring workstation 945 as an intended recipient.

Figure 19C:
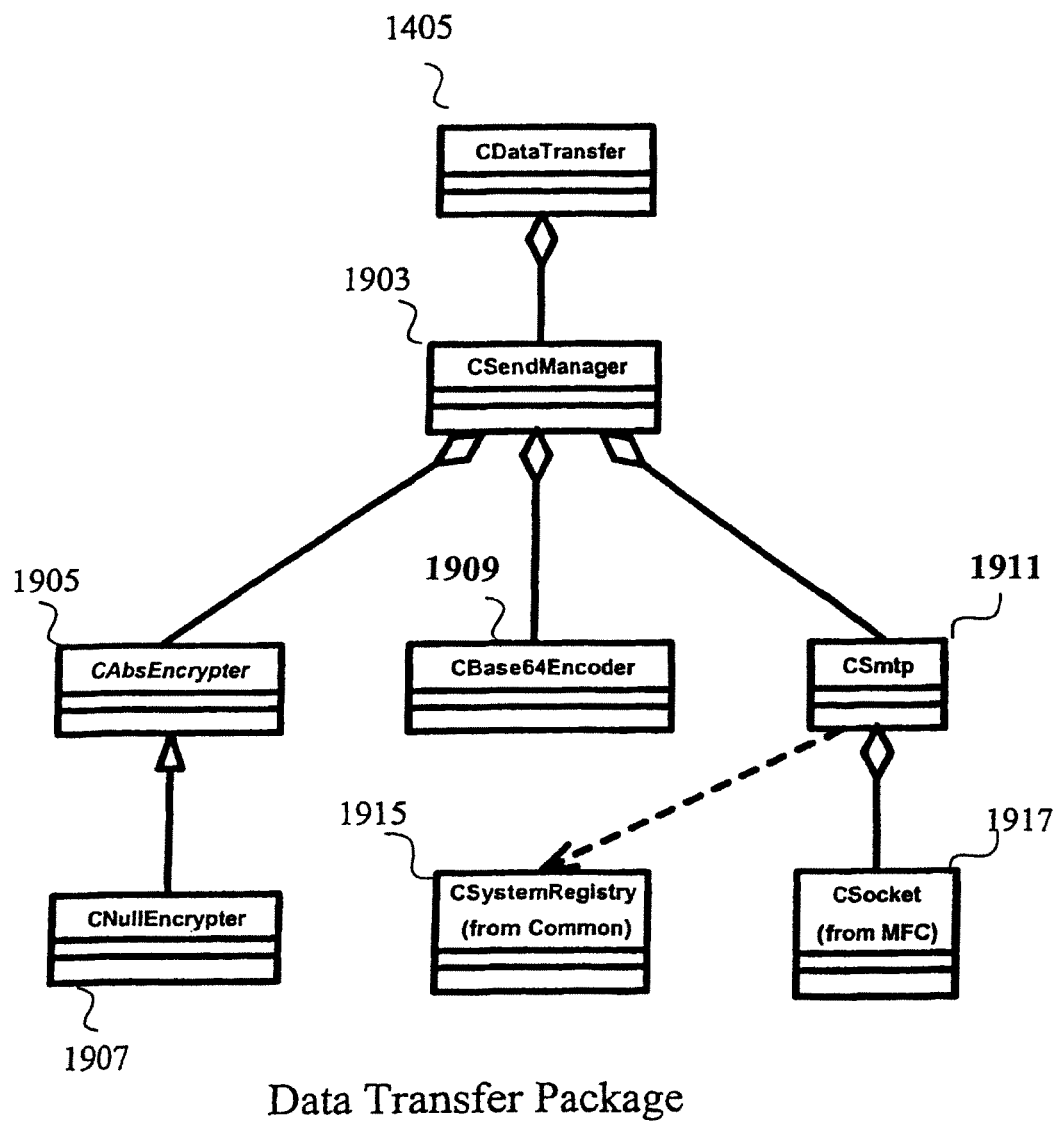
FIG. 19C illustrates a class structure of the data transfer module.

FIG. 19C is a class diagram illustrating one embodiment of the Data Transfer 1107 module of FIG. 11 according to the present invention. The Data Transfer 1107 module is responsible for formatting the configuration or status information collected from the monitored devices, and for sending that information as an attachment to an e-mail message from a remote monitoring workstation 911 to a central monitoring workstation 945, using, for example, SMTP. In one embodiment of the present invention, the monitoring information is sent as a MIME attachment to an e-mail message. The Data Transfer 1107 module is also responsible for encrypting the data and encoding the encrypted data using, for example, Base 64 encoding before sending the data. The Data Transfer 1107 module includes six classes: CDataTransfer 1405, CSendManager 1903, CAbsEncrypter 1905, CNullEncrypter 1907, CBase64Encoder 1909, and CSmtp 1911.

The CDataTransfer 1405 class provides the interface through which the functionality supported by the Data Transfer 1107 module is accessed. In one embodiment of the present invention, the CDataTransfer 1405 class includes four public methods through which all of the functionality of the Data Transfer 1107 module may be accessed. These methods include a setDestination( ) method, a startSend( ) method, a dataSend( ) method, and an endSend( ) method. The setDestination( ) method is used to configure both a source and destination address for an e-mail from a remote monitoring workstation 911 to a central monitoring workstation 945. The startSend( ) method is used to initiate communications between the remote monitoring workstation 911 and a SMTP server 915. The dataSend( ) method is used to send the monitoring information as an e-mail message from the remote monitoring workstation 911 to the central monitoring workstation 945 via the SMTP server 915. The dataSend( ) method supports the sending of either configuration information or status information. The endSend( ) method is used to shut down the communication link after the configuration or status information has been sent. While the Data Transfer 1107 module includes significantly more capabilities, the complexities of these capabilities are hidden from the public interface.

Returning to FIG. 19C, the CSendManager 1903 class includes classes that implement encrypting, encoding, and the management of a communication link between the remote monitoring workstation 911 and the SMTP server 915. CAbsEncrypter 1905 is an abstract class providing the flexibility to add new encryption methods by adding new derived classes of CAbsEncrypter 1905, such as, for example, CNullEncrypter 1907. This class structure provides the flexibility for an application to implement the desired level of encryption, or to change an encryption method without impacting the interface to the Data Transfer 1107 module.

The CBase64Encoder 1909 class provides base 64 encoding of the information before the information is sent. The CSmtp 1911 class is responsible for managing the communication link between the remote monitoring workstation 911 and the SMTP server 915. CSmtp 1911 makes use of the CSystemRegistry 1915 class for accessing the system registry to determine a source and destination e-mail address for the e-mail message header to be sent to the SMTP server 915. Furthermore, CSmtp 1911 makes use of the CSocket 1917 class available in the Microsoft foundation classes (MFC) for establishing and taking down the communication link between the remote monitoring workstation 911 and the SMTP server 915.

Figure 20:
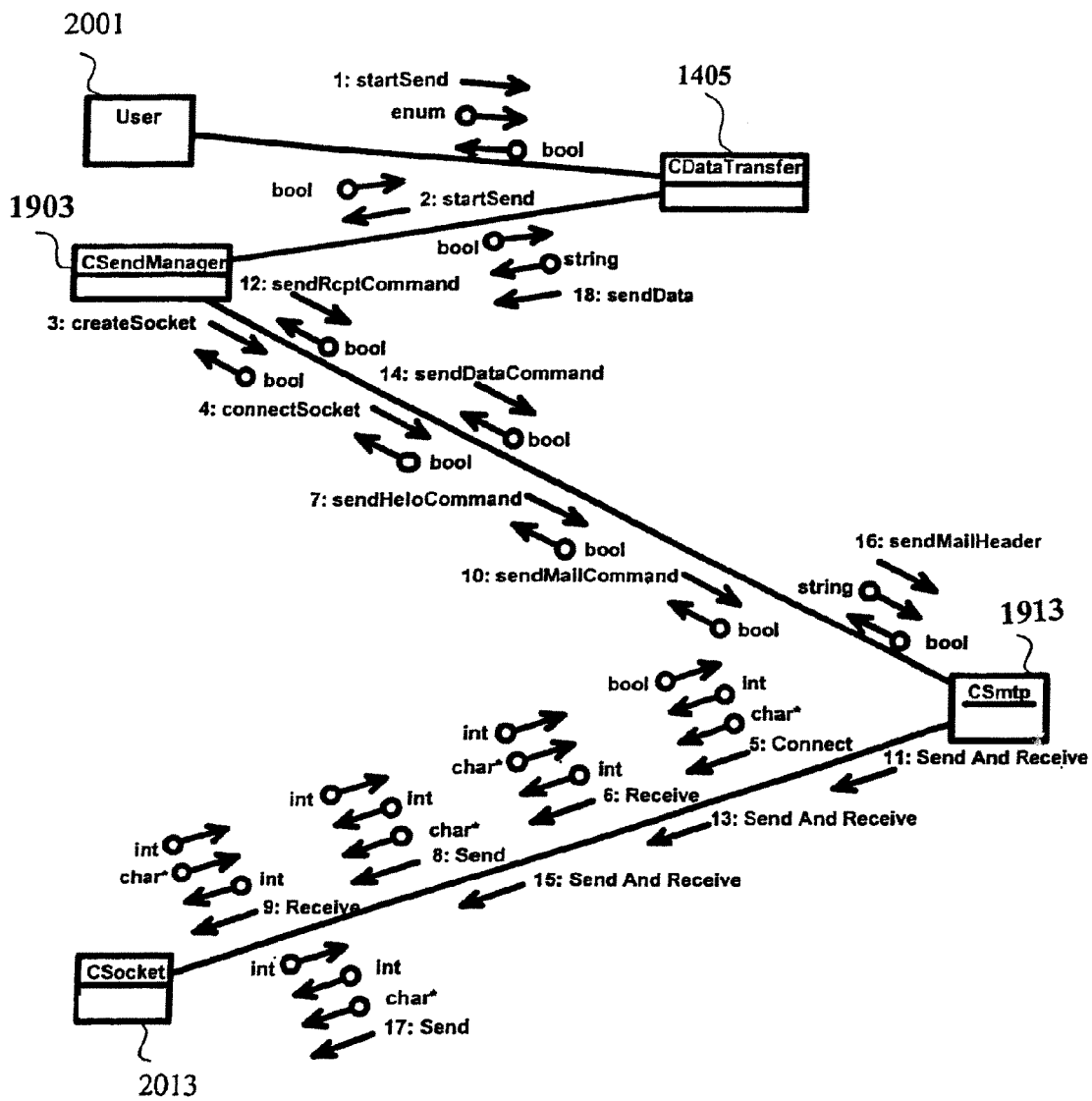
FIGS. 20, 21, 22, and 23 are collaboration diagrams for the data transfer module in transferring information to monitoring site.

FIG. 20 is a collaboration diagram illustrating the interaction among the classes of the Data Transfer 1107 module shown in FIG. 19C when a remote monitoring workstation 911 initiates communication by establishing a link to the SMTP server 915. In FIG. 20, the user 2001 corresponds to either the Device Monitor 1103 module or the Device Information 1105 module. As shown in FIG. 20, the process is initiated by the user 2001 invoking the startSend( ) method of the CDataTransfer 1405 class. In calling the startSend( ) method, the user 2001 indicates which type of information (e.g., configuration information or status information) will be sent.

In one embodiment of the present invention, the first line of a MIME attachment indicates that the MIME attachment includes configuration information. In another exemplary MIME attachment, the first line indicates that the MIME attachment includes status information. As described above, it is the startSend( ) method that ensures that the first line is appropriately populated. The exemplary MIME attachments described above are neither encrypted nor encoded.

Returning to FIG. 20, once the user 2001 has requested the initiation of communications, the CDataTransfer 1405 class will call the startSend( ) method of the CSendManager 1903 class. The CSendManager 1903 class manages the establishment of a communication link between the remote monitoring workstation 911 and the SMTP server 915 through interactions with the CSmtp 1913 class, which, in turn, interacts with the CSocket 2013 class.

In order to use SMTP, the CSendManger 1903 class calls the createSocket( ) method of the CSmtp 1913 class to create a socket to the SMTP server 915 through which the SMTP commands will be sent. Next, the CSendManager 1903 class calls the connectSocket( ) method of the CSmtp 1913 class to connect to that socket of the SMTP server 915. In response, the CSmtp 1913 class will call the Connect( ) and Receive( ) methods of the CSocket 2013 class to connect to the socket.

Once the socket has been established and connected to, the CSendManager 1903 class calls the sendHeloCommand( ) method of the CSmtp 1913 class to send the HELO SMTP command to the SMTP server 915. In response the CSmtp 1913 class will call the Send( ) method of the CSocket 2013 class to send the command to the socket of the SMTP server 915, and subsequently call the Receive( ) method of the CSocket 2013 class to receive a response from the socket of the SMTP server 915. Using the same approach, the CSendManager 1903 class will send the MAIL, RCPT, and DATA SMTP commands to the SMTP server 915 by respectively calling the sendMailCommand( ), sendRcptCommand( ), and sendDataCommand( ) methods of the CSmtp 1913 class. In response to each of the calls, the CSmtp 1913 class will call the Send( ) and Receive( ) methods of the CSocket 2013 class to send the commands to, and receive a response from, the socket of the SMTP server 915, respectively.

As would be understood by those of ordinary skill in the SMTP art, the HELO SMTP command is used by a client, for example, the remote monitoring workstation 911, to identify itself to the SMTP server 915, the MAIL SMTP command is used to identify the originator of a mail message, the RCPT SMTP command is used to identify the recipient for a mail message, and the DATA SMTP command is used to send the contents of a mail message.

Next, the CSendManager 1903 class calls the sendMailHeader( ) method of the CSmtp 1913 class to send the mail header for the e-mail message. The CSmtp 1913 class then calls the Send( ) method of the CSocket 2013 class to send the header to the socket of the SMTP server 915. At this point, the information to be included in the e-mail message can be sent through the socket of the SMTP server 915. The data corresponding to the appropriate information type of the monitored devices is sent by the CDataTransfer 1405 class calling the sendData( ) method of the CSendManager 1903 class.

Figure 21:
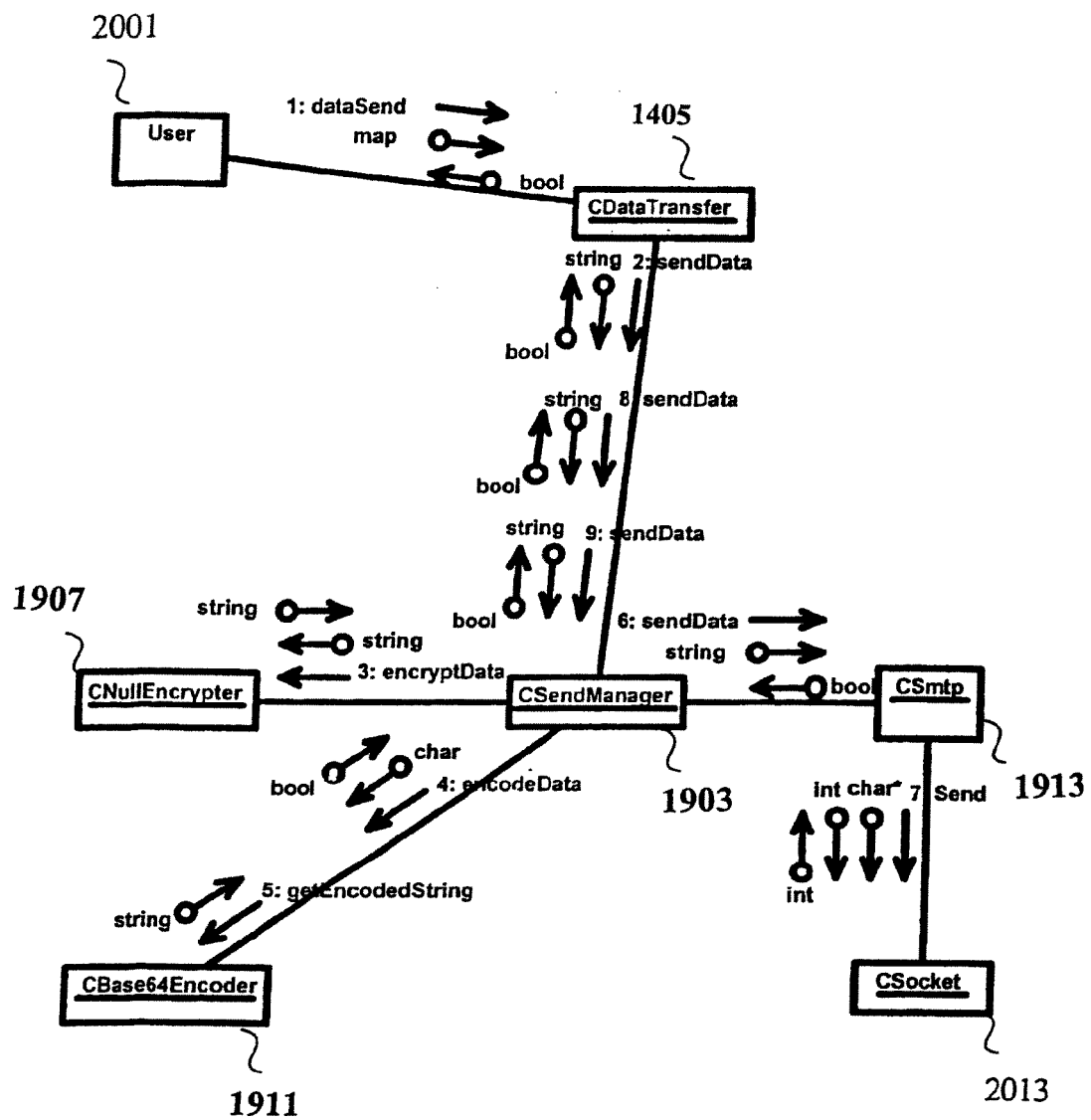

FIG. 21 is a collaboration diagram illustrating the interaction among the classes of the Data Transfer 1107 module shown in FIG. 19C to send either status or configuration data through e-mail in response to the Device Monitor 1103 module or the Device Information 1105 module, respectively. In FIG. 21, the user 2001 corresponds to either the Device Monitor 1103 module or the Device Information 1105 module. As shown in FIG. 21, the process is initiated by the user 2001 calling the dataSend( ) method of the CDataTransfer 1405 class. The user 2001 sends the map containing the configuration or status information as a parameter of the dataSend( ) method. The dataSend( ) method provides a single interface, through which both the Device Monitor 1103 module and the Device Information 1105 module provide information to be sent to the Data Transfer 1107 module. In response, the CDataTransfer 1405 class calls the sendData( ) method of the CSendManager 1903 class to send the information to the SMTP server 915. In one embodiment of the present invention, each call to the sendData( ) method of CSendManager 1903 class sends one key/data value pair stored in the map to the socket (steps 8 and 9 shown in FIG. 21 are illustrative of this approach). Prior to sending the data, however, the CSendManager 1903 class calls the encryptData( ) method of the CNullEncrypter 1907 class (or, as described above, another class derived from the CAbsEncrypter 1905 abstract class) to encrypt the data to be sent.

Next, the CSendManager 1903 class calls the encodeData( ) and getEncodedString( ) methods of the CBase64Encoder 1911 class to encode the encrypted data. To send the encrypted and encoded data, the CSendManager 1903 class calls the sendData( ) method of the CSmtp 1913 class, which, in turn, calls the Send( ) method of the CSocket 2013 class.

Figure 22:
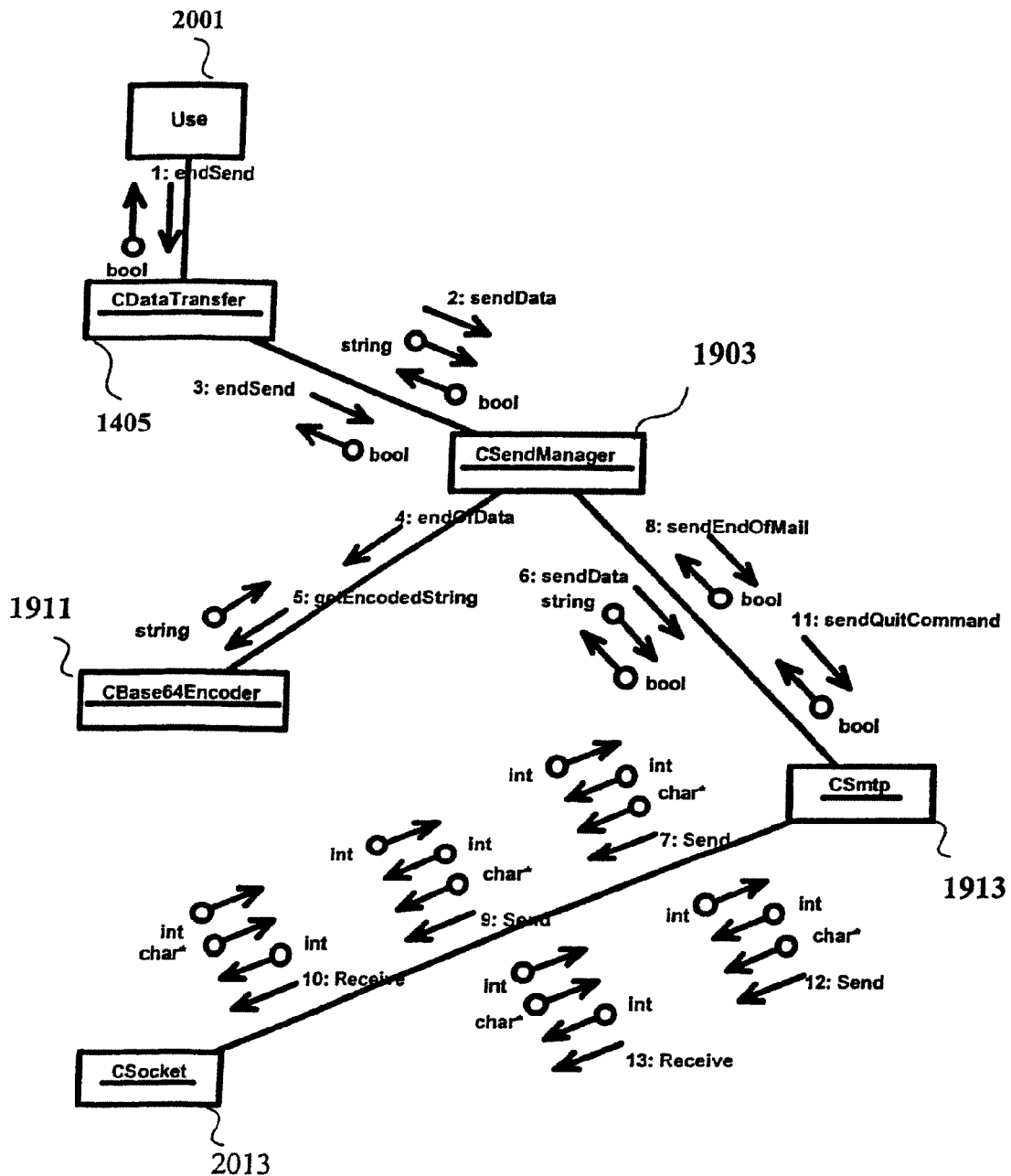

FIG. 22 is a collaboration diagram illustrating the interaction among the classes of the Data Transfer 1107 module shown in FIG. 19C when the sending of the configuration or status information through e-mail has been completed. In FIG. 22, the user 2001 corresponds to either the Device Monitor 1103 module or the Device Information 1105 module. As shown in FIG. 22, the process is initiated by the user 2001 calling the endSend( ) method of the CDataTransfer 1405 class. In response, the CDataTransfer 1405 class calls the sendData( ) method of the CSendManager 1903 class to send data indicating the end of the data to be sent. While it is not shown in FIG. 22, the data sent will be encrypted and encoded following the same approach as that described above in the context of FIG. 21. Next, the CDataTransfer 1405 class calls the endSend( ) method of the CSendManager 1903 class to complete the sending. The CSendManager 1903 class completes the sending of data by first calling the endOfData( ) and getEncodedString( ) methods of the CBase64Encoder 1911 class to obtain the last encoded information to be sent. Next, the CSendManager 1903 class calls the sendData( ) method of the CSmtp 1913 class to send the last encoded string containing data. To send the last encoded string, the CSmtp 1913 class calls the Send( ) method of the CSocket 2013 class.

Next, the CSendManager 1903 class calls the sendEndOfMail( ) method of the CSmtp 1913 class to send the end of the mail data. In turn, the CSmtp 1913 class calls the Send( ) method of the CSocket 2013 class to send the end of the mail data through the socket of the SMTP server 915 followed by a call to the Receive( ) method of the CSocket 2013 class to obtain a response from the socket. Next, the CSendManager 1903 class calls the sendQuitCommand( ) method of the CSmtp 1913 class to send the QUIT SMTP command to the socket of the SMTP server 915 to terminate the e-mail session between the remote monitoring workstation 911 and the SMTP server 915. In response, the CSmtp 1913 class calls the Send( ) and Receive( ) methods of the CSocket 2013 class to send the QUIT command and obtain a response from the socket.

Figure 23:
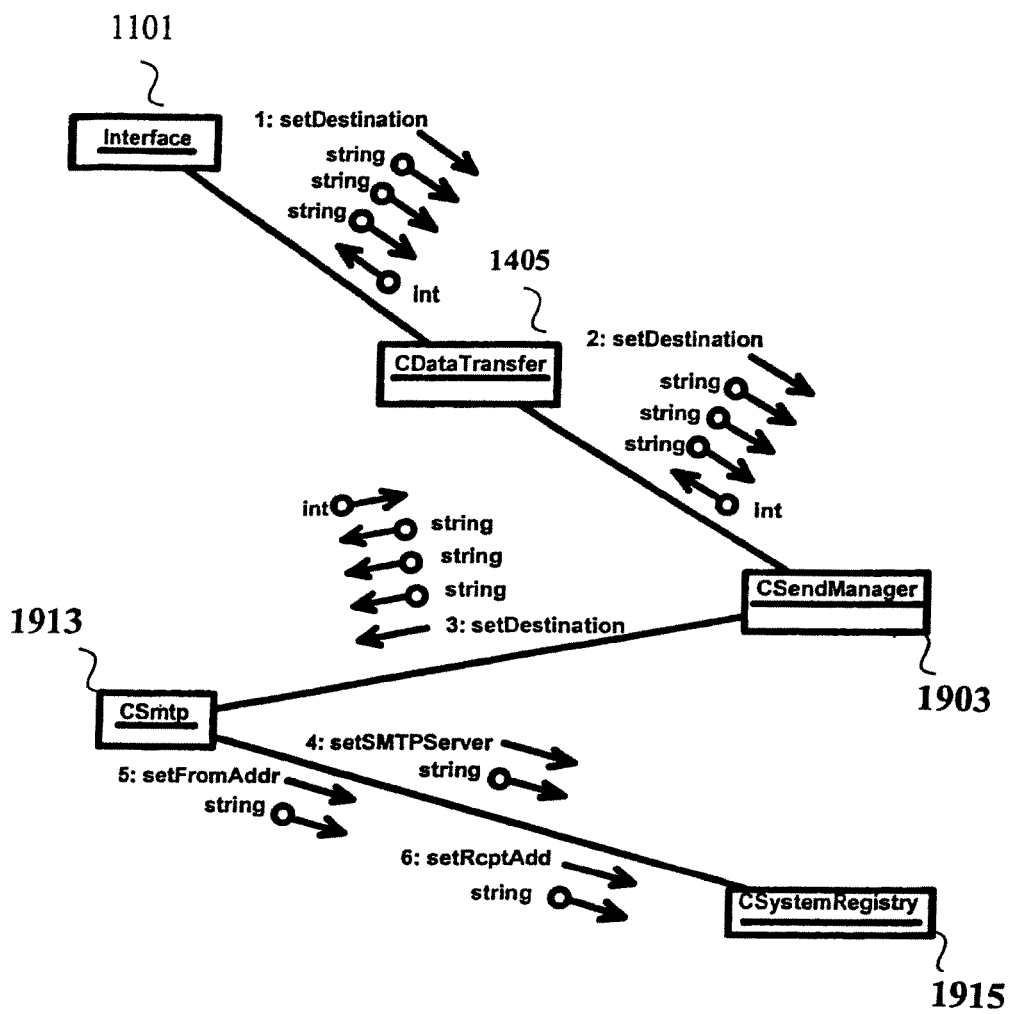

FIG. 23 is a collaboration diagram illustrating the interaction among the classes of the Data Transfer 1107 module shown in FIG. 19C to set up the system registry of the remote monitoring workstation 911 for sending device configuration and status information through e-mail to the central monitoring workstation 945. As shown in FIG. 23, the process is initiated by a call to the setDestination( ) method of the CDataTransfer 1405 class by the Interface 1101. In response, the CDataTransfer 1405 class calls the setDestination( ) method of the CSendManager 1403 class, which, in turn, calls the setDestination( ) method of the CSmtp 1913 class. To store the information in the system registry, the CSmtp 1913 class calls the setSMTPServer( ), setFromAddr( ), and setRcptAdd( ) methods of the CSystemRegistry 1915 class to store the SMTP Server, the from address, and the recipient address to be used in sending configuration or status information to the central monitoring workstation 945, respectively, in the system registry of the remote monitoring workstation 911.

Figure 24:
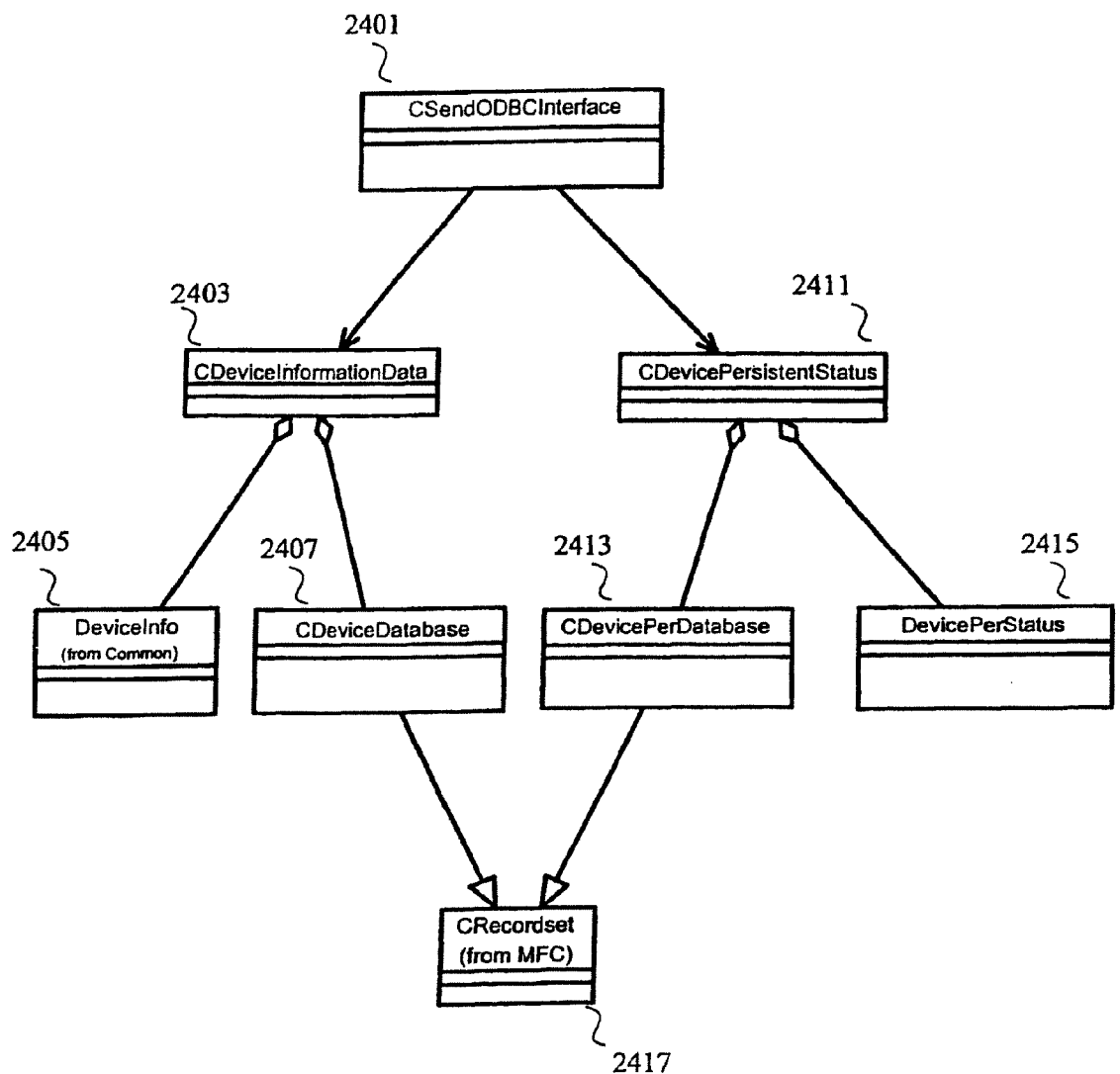
FIG. 24 illustrates a class diagram of the Open Database Connectivity (ODBC) interface module.

FIG. 24 is a class diagram illustrating one embodiment of the ODBC Interface 1109 module of FIG. 11 according to the present invention. The ODBC Interface 1109 module is responsible for interfacing with the database 913 that maintains the information pertaining to the SNMP devices being monitored by a particular remote monitoring workstation 911. In this embodiment, the database is registered as an ODBC database, and, therefore, the database 913 has available the appropriate supporting ODBC drivers. The ODBC Interface 1109 module includes five classes: CSendODBCInterface 2401, CDeviceInformationData 2403, CDeviceDatabase 2407, CDevicePersistentStatus 2411, and CDevicePerDatabase 2413. The CSendODBCInterface 2401 class provides the interface through which the functionality supported by the ODBC Interface 1109 module is accessed.

The CDeviceInformationData 2403 class provides methods for obtaining and storing configuration information of the monitored devices in the database 913. The CDeviceDatabase 2407 class provides an interface between the CDeviceInformationData 2403 class and the actual database 913 that contains the configuration information. The CDeviceInformationdata 2403 class uses the DeviceInfo structure to store the configuration information in the database 913.

The CDevicePersistentStatus 2411 class provides methods for obtaining and storing the first type of information of the monitored devices in the database. The CDevicePerDatabase 2407 provides an interface between the CDevicePersistentStatus 2411 class and the actual database that contains the first type of information. The CDevicePersistentStatus 2411 class uses the DevicePerStatus structure to store the first type of information in the database 913.

Both the CDeviceDatabase 2407 class and the CDevicePerDatabase 2413 class are derived from the CRecordset 2417 class available in the Microsoft Foundation Classes (MFC).

Obviously, numerous modifications and variations of the present invention are possible in light of the above teachings. It is therefore to be understood that within the scope of the appended claims, the invention may be practiced otherwise than as specifically described herein.

The invention claimed is:

1. A method for transferring information of printing devices from a first computer to a second computer, comprising:
registering a destination address for Internet email into a first storage of the first computer, the first computer being communicatively coupled to the printing devices through an Intranet network, wherein the first computer and the printing devices are separate and distinct stand-alone devices communicatively coupled to each other through the Intranet network;
obtaining, by the first computer, over the Intranet network using an application layer protocol and IP addresses of the printing devices, status information from the printing devices;
storing, by the first computer, the status information into a second storage;
querying the first storage to obtain the destination address for Internet email;
formatting the status information into a standard format of Internet email using the destination address after retrieving and processing the status information from the second storage, for transmission using an Internet email protocol;
creating, by the first computer, a communication link between the first computer and an SMTP server communicatively coupled to the first computer;
sending the formatted status information to the registered destination address through the communication link to the SMTP server using the Internet email protocol, wherein
retransmission attempts after failure of sending the formatted status information to the registered destination address occur automatically for a fixed period of time; and wherein
the second computer is configured to obtain the formatted status information, wherein the second computer is communicatively coupled to the SMTP server through a second network.

2. The method of claim 1, further comprising:
storing a source address corresponding to the first computer in the first storage of the first computer;
querying the first storage for the source address by the first computer; and
creating a message header including the source address and the destination address by the first computer, wherein the formatted status information includes the message header.

3. The method of claim 1, further comprising:
storing the status information obtained in the obtaining step by the first computer in a digital repository coupled to the first computer.

4. The method of claim 1 wherein the obtaining step comprises obtaining the status information using a simple network management protocol.

5. The method of claim 1, wherein the Internet email protocol comprises a simple mail transfer protocol.

6. The method of claim 1, wherein the obtaining step is performed by the first computer on a regular, periodic basis.

7. The method of claim 1, further comprising:
obtaining, by the first computer using SNMP and the IP addresses of the printing devices, a device-unique identifier of each printing device;
formatting configuration information and each device-unique identifier into a common map structure; and
sending the formatting configuration information and each device-unique identifier to the registered destination address as an email message.

8. A computer for transferring information of printing devices from the computer, which is communicatively coupled to the printing devices, through an Intranet network to a second computer, wherein the computer and the printing devices are separate and distinct stand-alone devices communicatively coupled to each other through the Intranet network, the computer comprising:
a processor; and
a computer readable medium encoded with processor readable instructions that when executed by the processor cause the processor to perform the steps of
registering a destination address for Internet email into a first storage of the computer;
obtaining, over the Intranet network using an application layer protocol and an IP addresses of the printing devices, status information from the printing devices;
storing, by the computer, the status information into a second storage;
querying the first storage to obtain the destination address for Internet email;
formatting the status information into a standard format of Internet email using the destination address after retrieving and processing the status information from the second storage, for transmission using an Internet email protocol;
creating a communication link between the computer and an SMTP server communicatively coupled to the computer;
sending the formatted status information to the registered destination address through the communication link to the SMTP server using the Internet email protocol, wherein
retransmission attempts after failure of sending the formatted status information to the registered destination address occur automatically for a fixed period of time; and wherein
the second computer is configured to obtain the formatted status information, wherein the second computer is communicatively coupled to the SMTP server through a second network.

9. The system of claim 8, wherein the computer readable medium is further encoded with processor readable instructions that when executed by the processor cause the processor to perform the steps of:
storing a source address corresponding to the computer in the first storage of the computer,
querying the first storage for the source address, and
creating a header including the source address and the destination address, wherein the formatted status information includes the header.

10. The system of claim 8, wherein the Internet email protocol comprises a simple mail transfer protocol.

11. The system of claim 8, wherein the computer readable medium is further encoded with processor readable instructions that when executed by the processor cause the processor to perform the step of storing the status information in a digital repository coupled to the computer and retrieving the status information from the digital repository.

12. A computer program product, comprising:
a non-transitory computer readable storage medium; and
a computer program code mechanism embedded in the computer readable storage medium for causing a computer to transfer information of printing devices from the computer communicatively coupled to the printing devices through an Intranet network to a second computer, wherein the computer and the printing devices are separate and distinct stand-alone devices communicatively coupled to each other through the Intranet network, the computer program code mechanism including
a first computer code device configured to register a destination address for Internet email into a first storage of the computer;
a second computer code device configured to obtain, over the Intranet network using an application layer protocol and IP addresses of the printing devices, status information from the printing devices;
a third computer code device configured to store the status information into a second storage;
a fourth computer code device configured to query the first storage to obtain the destination address for Internet email;
a fifth computer code device configured to format the status information into a standard format of Internet email using the destination address after retrieving and processing the status information from the second storage, for transmission at an Internet email protocol;
a sixth computer code device configured to create a communication link between the computer and an SMTP server communicatively coupled to the computer;
a seventh computer code device configured to send the formatted status information to the registered destination address through the communication link to the SMTP server using the Internet email protocol, wherein
retransmission attempts after failure of sending the formatted status information to the registered destination address occur automatically for a fixed period of time; and wherein
the second computer is configured to obtain the formatted status information, wherein the second computer is communicatively coupled to the SMTP server through a second network.

13. The computer program product of claim 12, wherein the computer program code mechanism further comprises
an eighth computer code device configured to store a source address corresponding to the computer in a first storage of the computer; and
a ninth computer code device configured to query the first storage for the source address, and create a header including the source address and the destination address, wherein the formatted status information includes the header.

14. The computer program product of claim 12, wherein the Internet email protocol comprises a simple mail transfer protocol.

15. The computer program product of claim 12, wherein the computer program code mechanism further comprises
an eighth computer code device configured to store the status information in a digital repository coupled to the computer and to retrieve the status information from the digital repository.

\* \* \* \* \*